(12) United States Patent
Kuhn et al.

(10) Patent No.: US 12,507,955 B2
(45) Date of Patent: Dec. 30, 2025

(54) SENSING FOR HEART FAILURE MANAGEMENT

(71) Applicant: Medtronic, Inc., Minneapolis, MN (US)

(72) Inventors: Jonathan L. Kuhn, Ham Lake, MN (US); James K. Carney, Roseville, MN (US); Vinod Sharma, Maple Grove, MN (US); Shantanu Sarkar, Roseville, MN (US); Todd M. Zielinski, Ham Lake, MN (US); Tommy D. Bennett, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 37 days.

(21) Appl. No.: 17/808,924

(22) Filed: Jun. 24, 2022

(65) Prior Publication Data

US 2022/0323007 A1    Oct. 13, 2022

Related U.S. Application Data

(63) Continuation of application No. 15/969,369, filed on May 2, 2018, now abandoned.

(51) Int. Cl.
  *A61B 5/00* (2006.01)
  *A61B 5/0205* (2006.01)
  (Continued)

(52) U.S. Cl.
  CPC ............ *A61B 5/686* (2013.01); *A61B 5/0205* (2013.01); *A61B 5/076* (2013.01);
  (Continued)

(58) Field of Classification Search
  None
  See application file for complete search history.

(56) References Cited

U.S. PATENT DOCUMENTS

| | | |
|---|---|---|
| 5,368,040 A | 11/1994 | Carney |
| 5,788,643 A | 8/1998 | Feldman |

(Continued)

FOREIGN PATENT DOCUMENTS

| | | |
|---|---|---|
| CN | 101175530 A | 5/2008 |
| CN | 103415319 A | 11/2013 |

(Continued)

OTHER PUBLICATIONS

Thomas, S. S., & Nohria, A. (2012). Hemodynamic classifications of acute heart failure and their clinical application—an update—. Circulation Journal, 76(2), 278-286. https://doi.org/10.1253/circj.cj-11-1441 (Year: 2012).*

(Continued)

*Primary Examiner* — Niketa Patel
*Assistant Examiner* — Anant A Gupta
(74) *Attorney, Agent, or Firm* — Shumaker & Sieffert, P.A.

(57) ABSTRACT

In some examples, determining a heart failure status includes using an implantable medical device configured for subcutaneous implantation and comprising a plurality of electrodes and an optical sensor. Processing circuitry of a system comprising the device may determine, for a patient, a current tissue oxygen saturation value based on a signal received from the at least one optical sensor, a current tissue impedance value based on a subcutaneous tissue impedance signal received from the electrodes, and a current pulse transit time value based on a cardiac electrogram signal received from the electrodes and at least one of the signal received from the optical sensor and the subcutaneous tissue impedance signal. The processing circuitry may further compare the current tissue oxygen saturation value, current tissue impedance value, and current pulse transit time value (Continued)

to corresponding baseline values, and determine the heart failure status of the patient based on the comparison.

20 Claims, 13 Drawing Sheets

(51) Int. Cl.
| | |
|---|---|
| *A61B 5/07* | (2006.01) |
| *A61B 5/1455* | (2006.01) |
| *A61B 5/1459* | (2006.01) |
| *A61B 5/287* | (2021.01) |
| *A61B 5/021* | (2006.01) |
| *A61B 5/0538* | (2021.01) |
| *A61N 1/362* | (2006.01) |
| *A61N 1/375* | (2006.01) |
| *A61N 1/39* | (2006.01) |
| *G16H 40/63* | (2018.01) |

(52) U.S. Cl.
CPC ........ *A61B 5/14552* (2013.01); *A61B 5/1459* (2013.01); *A61B 5/287* (2021.01); *A61B 5/486* (2013.01); *A61B 5/7275* (2013.01); *A61B 5/7282* (2013.01); *A61B 5/02125* (2013.01); *A61B 5/0538* (2013.01); *A61N 1/362* (2013.01); *A61N 1/3756* (2013.01); *A61N 1/3956* (2013.01); *G16H 40/63* (2018.01)

(56) References Cited

U.S. PATENT DOCUMENTS

| | | | |
|---|---|---|---|
| 5,857,975 | A | 1/1999 | Golub |
| 6,024,704 | A | 2/2000 | Meador et al. |
| 6,336,903 | B1 | 1/2002 | Bardy |
| 6,409,675 | B1 | 6/2002 | Turcott |
| 6,480,733 | B1 | 11/2002 | Turcott |
| 7,029,447 | B2 | 4/2006 | Rantala |
| 7,460,909 | B1 | 12/2008 | Koh et al. |
| 8,062,227 | B2 | 11/2011 | Cho et al. |
| 8,323,189 | B2 | 12/2012 | Tran |
| 8,346,332 | B2 | 1/2013 | Kuhn |
| 8,380,303 | B2 | 2/2013 | Rosenberg |
| 8,475,370 | B2 | 7/2013 | McCombie et al. |
| 8,491,485 | B2 | 7/2013 | Czygan et al. |
| 8,515,537 | B2* | 8/2013 | Cinbis ................ A61N 1/36557 607/17 |
| 8,521,281 | B2 | 8/2013 | Patel et al. |
| 8,708,924 | B2 | 4/2014 | Wariar et al. |
| 8,821,404 | B2 | 9/2014 | Thakur et al. |
| 8,886,296 | B2 | 11/2014 | Patel |
| 9,174,054 | B1 | 11/2015 | Nabutovsky |
| 9,662,073 | B2 | 5/2017 | Zhang |
| 9,669,218 | B2 | 6/2017 | Libbus |
| 9,826,939 | B2 | 11/2017 | Averina et al. |
| 10,172,568 | B2 | 1/2019 | Sharma et al. |
| 10,252,068 | B2 | 4/2019 | Gunderson et al. |
| 10,610,132 | B2 | 4/2020 | Gunderson et al. |
| 10,850,113 | B2 | 12/2020 | Cao et al. |
| 11,154,249 | B2* | 10/2021 | Kuhn ................ A61B 5/14546 |
| 2002/0058969 | A1 | 5/2002 | Noren et al. |
| 2006/0041281 | A1 | 2/2006 | Von Arx et al. |
| 2006/0058593 | A1* | 3/2006 | Drinan ................... A61B 5/685 600/301 |
| 2007/0115277 | A1 | 5/2007 | Wang et al. |
| 2007/0129765 | A1 | 6/2007 | Gilkerson et al. |
| 2007/0260285 | A1 | 11/2007 | Libbus et al. |
| 2008/0183083 | A1 | 7/2008 | Markowitz et al. |
| 2008/0228090 | A1 | 9/2008 | Wariar |
| 2009/0062667 | A1 | 3/2009 | Fayram et al. |
| 2009/0281399 | A1* | 11/2009 | Keel ................ A61B 5/02158 600/513 |
| 2009/0326350 | A1 | 12/2009 | Kracker |
| 2010/0010338 | A1 | 1/2010 | van Dam et al. |
| 2010/0030086 | A1* | 2/2010 | Zielinski ................ A61B 5/053 600/509 |
| 2010/0041970 | A1 | 2/2010 | Hedberg et al. |
| 2010/0113944 | A1 | 5/2010 | Min et al. |
| 2010/0274219 | A1 | 10/2010 | Wenzel et al. |
| 2011/0009754 | A1* | 1/2011 | Wenzel ................ A61B 5/0295 600/485 |
| 2011/0098771 | A1* | 4/2011 | Thakur ................ A61B 5/0538 607/27 |
| 2011/0105932 | A1 | 5/2011 | Bauer et al. |
| 2011/0106201 | A1 | 5/2011 | Bhunia |
| 2011/0172504 | A1 | 7/2011 | Wegerich |
| 2011/0224498 | A1 | 9/2011 | Banet et al. |
| 2011/0230771 | A1 | 9/2011 | Koh |
| 2012/0109243 | A1* | 5/2012 | Hettrick ................ A61B 5/686 600/509 |
| 2012/0133602 | A1 | 5/2012 | Kamamoto et al. |
| 2012/0172680 | A1 | 7/2012 | Gelfand et al. |
| 2013/0096449 | A1 | 4/2013 | Patel et al. |
| 2013/0116578 | A1* | 5/2013 | An ................... A61B 5/7275 600/484 |
| 2013/0123617 | A1 | 5/2013 | Sola i Caros et al. |
| 2013/0165802 | A1* | 6/2013 | Dalal ................... A61B 5/7257 607/23 |
| 2013/0179139 | A1 | 7/2013 | Lee |
| 2013/0184545 | A1 | 7/2013 | Blomqvist et al. |
| 2013/0237948 | A1 | 9/2013 | Donders et al. |
| 2014/0195168 | A1 | 7/2014 | Shaikh |
| 2014/0221849 | A1 | 8/2014 | Farringdon et al. |
| 2014/0276928 | A1* | 9/2014 | Vanderpool ........ A61B 17/3468 606/129 |
| 2014/0330172 | A1 | 11/2014 | Jovanov et al. |
| 2014/0343371 | A1 | 11/2014 | Sowers, II et al. |
| 2015/0164437 | A1 | 6/2015 | Mccombie et al. |
| 2015/0283383 | A1 | 10/2015 | Ternes et al. |
| 2016/0081571 | A1 | 3/2016 | Bauer |
| 2016/0095555 | A1 | 4/2016 | Stainer et al. |
| 2016/0310031 | A1 | 10/2016 | Sarkar et al. |
| 2016/0367194 | A1 | 12/2016 | Murphy |
| 2017/0119263 | A1 | 5/2017 | Hill |
| 2017/0156604 | A1 | 6/2017 | Zhang |
| 2017/0209053 | A1 | 7/2017 | Pantelopoulos et al. |
| 2017/0231568 | A1 | 8/2017 | An |
| 2017/0238812 | A1 | 8/2017 | Atlas |
| 2017/0265782 | A1 | 9/2017 | Vollmer |
| 2017/0281095 | A1 | 10/2017 | An et al. |
| 2017/0347969 | A1 | 12/2017 | Thakur et al. |
| 2018/0035898 | A1 | 2/2018 | Gunderson |
| 2018/0035920 | A1 | 2/2018 | Gunderson et al. |
| 2018/0035924 | A1 | 2/2018 | Gunderson et al. |
| 2018/0035956 | A1 | 2/2018 | Gunderson et al. |
| 2018/0055386 | A1 | 3/2018 | Zielinski et al. |
| 2018/0060520 | A1 | 3/2018 | Degen et al. |
| 2018/0070876 | A1* | 3/2018 | Brockway .............. A61B 5/686 |
| 2018/0177486 | A1 | 6/2018 | Gifford, III |
| 2019/0133457 | A1* | 5/2019 | Sun ....................... A61B 5/0205 |
| 2019/0336076 | A1 | 11/2019 | Kuhn et al. |
| 2019/0336077 | A1 | 11/2019 | Kuhn et al. |
| 2020/0187866 | A1 | 6/2020 | Antunes et al. |
| 2020/0323452 | A1 | 10/2020 | Mahajan et al. |
| 2020/0352521 | A1 | 11/2020 | Chakravarthy et al. |
| 2021/0127992 | A1 | 5/2021 | Gunderson et al. |

FOREIGN PATENT DOCUMENTS

| | | |
|---|---|---|
| CN | 104349815 A | 2/2015 |
| CN | 106659403 A | 5/2017 |
| EP | 2217140 A1 | 8/2010 |
| WO | 2009072034 A1 | 6/2009 |
| WO | 2010014066 A | 2/2010 |
| WO | 2016061381 A1 | 4/2016 |
| WO | WO-2017100188 A2 * | 6/2017 ........... A61B 5/0024 |

OTHER PUBLICATIONS

"Causes of Hypoperfusion state," Right Diagnosis, last updated Aug. 13, 2015, accessed from http://www.fightdiagnosis.com/

(56) References Cited

OTHER PUBLICATIONS symptoms/hypoperfusion_state/causes.htm, 2 pp.
"VCSEL-ULM763-SingleMODE_TO5_v13," Philips, accessed on Nov. 7, 2017, accessed from http://www.photonics.philips.com/pdf/VCSEL-ULM763-SingleMode_TO5.pdf, 2 pp.
Abay et al., "Reflectance Photoplethysmography as Noninvasive Monitoring of Tissue Blood Perfusion," IEEE Transactions on Biomedical Engineering, vol. 62, No. 9, Sep. 2015, pp. 2187-2195.
Bennett, et al., "Development of Implantable Devices for Continuous Ambulatory Monitoring of Central Hemodynamic Values in Heart Failure Patients." Pace, vol. 28. Jun. 2005, pp. 573-584.
Bernard, Michael L. "Pacing Without Wires: Leadless Cardiac Pacing." The Ochsner journal vol. 16,3 (2016): 238-42 (Year: 2016).
Yancy, MD et al. "2016 ACC/AHA/HFSA Focused Update on New Pharmacological Therapy for Heart Failure: An Update of the 2013 ACCF/AHA Guideline for the Management of Heart Failure." Journal of Cardiac Failure vol. 22 No. 9, Sep. 2016, pp. 659-669.
Charach, et al., "Internal Thoracic Impedance—A Useful Method for Expedient Detection and Convenient Monitoring of Pleural Effusion," Plos One, published Apr. 28, 2015, 14 pp.
Cowie, et al., "Development and validation of an integrated diagnostic algorithm derived from parameters monitored in implantable devices for identifying patients at risk for heart failure hospitalization in an ambulatory setting," European Heart Journal; 43, published online Mar. 19, 2013, pp. 2472-2480.
Edlow et al., "The effects o healthy aging on cerebral hemodynamic responses to posture change," Physiological Measurement, vol. 31, No. 4, Feb. 2010, 19 pp.
Fontaine, et al., "Reflectance-Based Pulse Oximeter for the Chest and Wrist," A Major Qualifying Project Report. Worchester Polytechnic Institute, accessed on Novmeber 7, 2017, 96 pp.
Forrester, et al., "Correlative Classification of Clinical and Hemodynamic Function after Acute Myocardial Infarction." the American Journal of Cardiology, vol. 39, Issue 2, Feb. 1977, pp. 137-145.
Gholamhosseini et al., "Smartphone-based blood pressure monitoring for falls risk assessment: techniques and technologies," Human Monitoring, Smart Health and Assisted Living: Techniques and Technologies, May 31, 2017, pp. 203-215.
Hogan et al., "Quantitative tissue hemoglobin oxygen saturation measurement in decompensated heart failure," J. Cardiothoracic-Renal Research May 2006 1, 153-157.
Hogan et al., "The Utility of Microvascular Perfusion Assessment in Heart Failure: A Pilot Study," J. Cardiac Failure vol. 11, No. 9, Jul. 2005, pp. 713-719.
International Search Report and Written Opinion of International Application No. PCT/US2019/030166, mailed Jul. 24, 2019, 14 pp.
Yancy, MD et al. "2013 ACCF/AHA Guideline for the Management of Heart Failure." Circulation. May 2013;128: pp. e240-e327.
J. Fiala et al., Implantable Reflectance Pulse Transit Time Blood Pressure Sensor with Oximetry Capability, Proceedings SPIE 7513, 2009 International Conference on Optical Instruments and Technology, val. 7715, Apr. 28, 2010, ISSN: 0277-786x, DOI: 10.1117/12.854512, ISBN: 978-1-5106-2781-9.
Myers, et al., "Tissue hemoglobin index: a non-invasive optical measure of total tissue hemoglobin," Critical Care, vol. 13, Suppl. 5, Nov. 30, 2009, 13 pp.
Nohria, MD, et al. "Clinical Assessment Identifies Hemodynamic Profiles that Predict Outcomes in Patients Admitted with Heart Failures," J. Am. Col Cardiology, vol. 41, No. 10, May 21, 2003, 1797-1804.
Podbregar, et al., "Skeletal muscle oxygen saturation does not estimate mixed venous oxygen saturation in patients with severe left heart failure and additional severe sepsis or spectic shock," Critical Care Jan. 2007, 11: R6.
Ponikowski et al. "2016 ESC Guidelines for the diagnosis and treatment of acute and chronic heart failure." European Heart Journal, May 2016, 37, 2129-2200.
Prosecution History from U.S. Appl. No. 15/969,369, dated Nov. 15, 2019 through Apr. 26, 2022, 293 pp.
Sarkar, "A Dynamic Risk Score to Identify Increased Risk for Heart Failure Decompensation." IEEE Transactions on Biomedical Engineering, vol. 60, No. 1, Jan. 2013, pp. 147-150.
Study: "Integrated Diagnostics Driven Diuretic and Chronic Medication Management for Heart Failure". Sponsor: Medtronic Cardiac Rhythm and Heart Failure. https://clinicaltrials.gov/ct2/show/NCT02698241, lasted updated Apr. 2, 2018, 6 pp.
Virani, et al. "Integrated Diagnostics for Heart Failure: The Triage-HF Study." Canadian Journal of Cardiology. October 201 vol. 32, Issue 10, Supplement 1, pp. S148-S149.
Auricchio et al., "Reducing Ventricular Pacing Frequency in Patients with Atrioventricular Block", Advances in Arrhythmia and Electrophysiology, vol. 9, No. 9, American Heart Association, Sep. 16, 2016, p. 10.
Bereski-Reguig et al., "A New System for Measurement of the Pulse Transit Time, the Pulse Wave Velocity and its Analysis", World Scientific, Journal of Mechanics in Medicine and Biology, vol. 17, No. 1, Apr. 2016, 21 pp.
Extended Search Report from counterpart European Application No. 22176938.3 dated Sep. 13, 2022, 8 pp.
Fiala et al., "Implantable reflectance pulse transit time blood pressure sensor with oximetry capability", Proceedings SPIE 7513, 2009 International Conference on Optical Instruments and Technology, vol. 7715, Apr. 2010, pp. 77152Q-1-77152Q-5.
U.S. Appl. No. 17/804,259, filed May 26, 2022 naming inventors Ya-Jian Cheng et al.
Second Office Action and Search Report, and translation thereof, from counterpart Chinese Application No. 201980029815.3 dated Jan. 10, 2024, 11 pp.
Notice of Intent to Grant from counterpart Chinese Application No. 201980029815.3 dated Apr. 3, 2024, 3 pp.

* cited by examiner

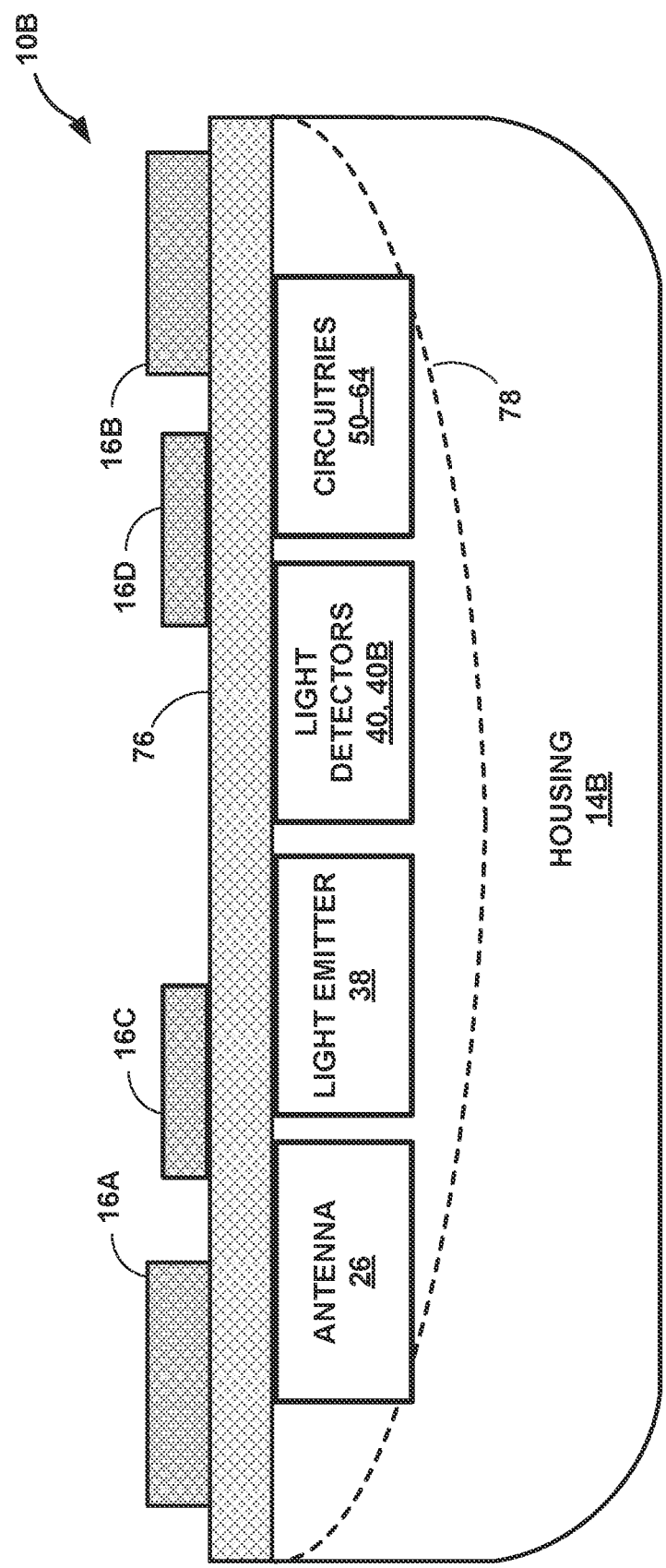

SENSING FOR HEART FAILURE MANAGEMENT

This application is a continuation of U.S. patent application Ser. No. 15/969,369, filed May 2, 2018, the entire content of which is incorporated herein by reference.

TECHNICAL FIELD

The disclosure relates generally to medical device systems and, more particularly, medical device systems configured to monitor patient parameters.

BACKGROUND

Some types of implantable medical devices (IMDs) may be used to monitor one or more physiological parameters of a patient, such as physiological parameters associated with cardiac function. Such IMDs may include, or may be part of a system that includes, sensors that detect signals associated with such physiological parameters; e.g., cardiac depolarization or tissue impedance. Values determined based on such signals may be used to assist in detecting changes in cardiac conditions such as heart failure, in evaluating the efficacy of a therapy, or in generally evaluating cardiac health.

Implantable devices that monitor physiological parameters related to a heart failure condition of a patient may evaluate values associated with the physiological parameters, such as to determine whether the values satisfy a threshold or have changed. Values that satisfy a threshold or that have changed may indicate that a therapy being administered to the patient is not effectively managing the patient's heart failure condition.

SUMMARY

In general, this disclosure is directed to techniques for determining a heart failure status of a patient. Such techniques may include performing assessments associated with aspects of a patient's cardiac function, and determining a hemodynamic profile of the patient based on the outcome of the assessments. Such hemodynamic profiles may indicate a heart failure status of the patient, e.g., whether the patient's heart failure status is stable or progressing, and may help guide therapy selection.

When a patient presents at a healthcare facility with acute heart failure symptoms, a clinician may perform assessments associated with aspects of the patient's cardiac function, such as preload, afterload, and perfusion, by observing surrogate parameters. For example, in order to assess preload (a measure of heart filling capacity), a clinician may observe the patient for signs of congestion, such as peripheral edema, jugular venous dilatation, ascites, or others. To assess afterload (a measure of vascular resistance) a clinician may use blood pressure measurements as a surrogate parameter to determine whether the patient's vascular resistance is high and therefore indicative of vasoconstriction. To assess perfusion (an indication of supply or cardiac output versus metabolic demand or body surface area) a clinician may observe the patient for signs of inadequate peripheral perfusion, such as cold sweated extremities, oliguria, mental confusion, dizziness, and numbness and tingling in extremities. Based on the combined outcome of these assessments, a clinician may identify a hemodynamic profile of the patient (e.g., congested+vasoconstricted+adequately perfused), and prescribe treatment in accordance with the hemodynamic profile. Such treatment may include drug therapy to compensate for a loss of cardiac function caused by the patient's heart failure condition. Thereafter, the patient may be discharged from the healthcare facility with instructions for continuing the prescribed therapy and scheduling regular clinician visits.

For one or more reasons, however, a patient's heart failure condition, which may be in a state of chronic but stable decompensation when adequately managed by therapy, may become unstable and acutely decompensate, that is, no longer adequately be managed by therapy, between clinician visits. For example, the progressive nature of heart disease may cause a patient not exhibiting congestion at a previous clinician visit to become congested between visits, which may be due to physiological cardiac remodeling that occurs in the progression of HF. Or, a confounding factor such as over-the-counter medication intake may be eliminated or introduced, leading to a change in vasoconstriction. In any such cases, the patient may become symptomatic and acutely decompensate between visits. In some examples, such acute decompensation may lead to hospitalization or other adverse medical events. Consequently, clinical outcomes for heart-failure patients would benefit from methods for updating a patient's hemodynamic profile and heart failure status between clinician visits, which in turn may enable prediction of a likelihood that an acute decompensation and hospitalization may occur. In response to such a prediction, a patient's treatment may be adjusted (e.g., by modifying a drug regimen), which may help reduce the patient's likelihood of acute decompensation and hospitalization.

However, assessment of a patient's heart failure status based on observations of the surrogate parameters of congestion (i.e., hypervolemia), peripheral perfusion, and vascular resistance may be limited to clinical or hospital settings. For example, such assessments may require medical expertise unavailable to the patient in a non-clinical environment. Thus, methods for updating a patient's hemodynamic profile between clinician visits may be performed using one or more medical devices, such as the subcutaneously-implantable medical devices described herein.

Accordingly, techniques described herein may include automatically detecting and monitoring parameters associated with cardiac function that are measurable by one or more medical devices, which may include a subcutaneously implantable medical device, which may in some cases be leadless. As with a clinician's assessments, such parameters may be indicative of congestion, peripheral perfusion, and vascular resistance or blood pressure. When taken together, this three-part evaluation of a patient's cardiac function may provide a robust indication of whether a heart failure status of the patient has changed, which may be useful in detecting, or assessing the patient's likelihood of, acute decompensation and in proactively modifying the patient's therapy. Because the methods described herein are intended to be performed by one or more medical devices in between clinician visits, such methods may use sensors, such as electrodes and optical sensors, to monitor certain parameters of the patient's cardiac function in place of the signs observed by a clinician.

For example, instead of assessing external signs of congestion, some of the methods described herein include determining a subcutaneous tissue impedance value (Z), which is a surrogate for congestion. Instead of assessing signs of peripheral perfusion, some of the methods described herein include determining a tissue oxygen saturation ($StO_2$) value, which provides a surrogate for cardiac output and peripheral perfusion. Instead of assessing vascular resistance via blood pressure measurements, some of the methods described herein include determining a pulse transit time (PTT) value. It should be noted that, although not strictly equivalent, vascular resistance and blood pressure may be described interchangeably as being assessable by PTT. In some examples, PTT may be used to determine a measurement of pulse wave velocity (PWV), the former of which indicates the time it takes a pulse wave (e.g., of an ECG signal) to travel over an estimable distance within the patient. In such examples, the estimable distance traveled by the pulse wave may be divided by a determined PTT value to arrive at a PWV value. The PWV value may be used instead of or in addition to the PTT value in assessing vascular resistance but, for a given patient, the estimable distance can be assumed constant, and changes in PTT considered representative of changes in PWV. For the sake of clarity, the techniques described herein are described as assessing vascular resistance based on PTT.

A comparison of current values of Z, $StO_2$, or PTT to corresponding baseline values may be used to determine a status of the patient's heart failure condition, such as whether the condition is stable or has changed, e.g., progressed or worsened. In techniques described herein, a one or more IMDs may determine a patient's heart failure status and transmit the heart failure status to a remote computer or other device external to the patient. In some cases, the patient's heart failure status may indicate whether the patient is congested, inadequately perfused, or vasoconstricted, and may further indicate the patient's likelihood of decompensation or hospitalization. The remote computer then may transmit instructions for a medical intervention (e.g., instructions for changes to a drug regimen), to a user device used by the patient or a caregiver. In this manner, a patient's heart failure treatment may be modified as needed in between clinic visits, which may help avoid adverse medical events such as recurrent symptoms or hospitalization.

In examples in which a clinician is involved in determining the instructions for the medical intervention, the techniques described herein may enable the clinician to make determinations regarding the medical intervention by accounting for the interrelated nature of the physiological causes of the patient's Z, $StO_2$, or PTT values. For example, a downward trend in a Z value may indicate that the patient's likelihood of congestion has increased, but the clinician may be hesitant to modify the patient's drug regimen on this basis alone. However, by additionally providing $StO_2$ and PTT values, the techniques described herein may enable the clinician to determine whether a particular modification to the patient's drug regimen to address potential congestion (e.g., increasing a dosage of a diuretic drug) may be desirable. In this manner, the techniques described herein may increase the clinician's confidence in prescribing a particular medical intervention, which may lead to improved clinical outcomes for the patient.

In one example, a method for determining a heart failure status of a patient using an implantable medical device configured for subcutaneous implantation outside of a thorax of the patient, the implantable medical device comprising a plurality of electrodes and at least one optical sensor, comprises, by processing circuitry of a medical device system comprising the implantable medical device: determining a current tissue oxygen saturation value of the patient based on a signal received from the at least one optical sensor; determining a current tissue impedance value of the patient based on a subcutaneous tissue impedance signal received from a first at least two of the plurality of electrodes; determining a current pulse transit time value of the patient based on a cardiac electrogram signal received from a second at least two of the plurality of electrodes and at least one of the signal received from the at least one optical sensor and the subcutaneous tissue impedance signal; comparing the current tissue oxygen saturation value, the current tissue impedance value, and the current pulse transit time value to corresponding ones of a baseline tissue oxygenation saturation value, a baseline tissue impedance, and a baseline pulse transit time value; and determining the heart failure status of the patient based on the comparison.

In another example, a system for determining a heart failure status of a patient using an implantable medical device configured for subcutaneous implantation outside of a thorax of the patient comprises the implantable medical device, which comprises at least one optical sensor; and a plurality of electrodes; and processing circuitry configured to: determine a current tissue oxygen saturation value of the patient based on a signal received from the at least one optical sensor; determine a current tissue impedance value of the patient based on a subcutaneous tissue impedance signal received from a first at least two of the plurality of electrodes; determine a current pulse transit time value of the patient based on a cardiac electrogram signal received from a second at least two of the plurality of electrodes and at least one of the signal received from the at least one optical sensor and the subcutaneous tissue impedance signal; compare the current tissue oxygen saturation value, the current tissue impedance value, and the current pulse transit time value to corresponding ones of a baseline tissue oxygenation saturation value, a baseline tissue impedance, and a baseline pulse transit time value; and determine the heart failure status of the patient based on the comparison.

In another example, a system for determining a heart failure status of a patient using an implantable medical device configured for subcutaneous implantation outside of a thorax of the patient comprises the implantable medical device, which comprises: at least one optical sensor; a plurality of electrodes; and processing circuitry configured to: determine a current tissue oxygen saturation value of the patient based on the signal received from the at least one optical sensor; determine a current tissue impedance value of the patient based on a subcutaneous tissue impedance signal received from a first at least two of the plurality of electrodes; determine a current pulse transit time value of the patient based on a cardiac electrogram signal received from a second at least two of the plurality of electrodes and at least one of the signal received from the at least one optical sensor and the subcutaneous tissue impedance signal; determine whether a difference between the current tissue oxygen saturation value and the baseline tissue oxygen saturation value satisfies a tissue oxygen saturation threshold value that is associated with a change in a tissue-perfusion status of the patient; determine whether a difference between the current tissue impedance value and the baseline tissue impedance value satisfies a tissue impedance threshold value that is associated with a change in a congestion status of the patient; determine whether a difference between the current pulse transit time value and the baseline pulse transit time value satisfies a threshold pulse transit time value that is associated with a change in a blood-pressure status of the patient; determine the heart failure status of the patient based on at least one of the difference between the current tissue oxygen saturation value and the baseline tissue oxygen saturation value, the difference between the current tissue impedance value and the baseline tissue impedance value, and the difference between the current pulse transit time and the baseline pulse transit time; and transmit the heart failure status of the patient to a remote computer; and the remote computer, wherein the remote computer comprises processing circuitry configured to: receive the heart failure status of the patient transmitted by the processing circuitry of the implantable medical device; and transmit the instructions for the medical intervention to a user device.

In another example, a system for determining a heart failure status of a patient comprises means for determining a current tissue oxygen saturation value of the patient based on a signal received from at least one optical sensor; means for determining a current tissue impedance value of the patient based on a subcutaneous tissue impedance signal received from a first at least two of a plurality of electrodes; means for determining a current pulse transit time value of the patient based on a cardiac electrogram signal received from a second at least two of the plurality of electrodes and at least one of the signal received from the at least one optical sensor and the subcutaneous tissue impedance signal; means for comparing the current tissue oxygen saturation value, the current tissue impedance value, and the current pulse transit time value to corresponding ones of a baseline tissue oxygenation saturation value, a baseline tissue impedance, and a baseline pulse transit time value; and means for determining the heart failure status of the patient based on the comparison.

In another example, a non-transitory computer-readable medium stores instructions for causing processing circuitry to perform a method for determining a heart failure status of a patient using an implantable medical device configured for subcutaneous implantation outside of a thorax of the patient, the implantable medical device comprising a plurality of electrodes and at least one optical sensor, the method comprising determining a current tissue oxygen saturation value of the patient based on a signal received from the at least one optical sensor; determining a current tissue impedance value of the patient based on a subcutaneous tissue impedance signal received from a first at least two of the plurality of electrodes; determining a current pulse transit time value of the patient based on a cardiac electrogram signal received from a second at least two of the plurality of electrodes and at least one of the signal received from the at least one optical sensor and the subcutaneous tissue impedance signal; comparing the current tissue oxygen saturation value, the current tissue impedance value, and the current pulse transit time value to corresponding ones of a baseline tissue oxygenation saturation value, a baseline tissue impedance, and a baseline pulse transit time value; and determining the heart failure status of the patient based on the comparison.

In another example, a system for determining a heart failure status of a patient comprises one or more sensors configured to monitor one or more parameters of the patient; and processing circuitry configured to: determine current values of the one or more parameters of the patient based on one or more signals received from the one or more sensors, the one or more parameters comprising a surrogate parameter for congestion, a surrogate parameter for tissue perfusion, and a surrogate parameter for blood pressure; compare the current value of the surrogate parameter for congestion, the current value of the surrogate parameter for tissue perfusion, and the current value of the surrogate parameter for blood pressure to corresponding ones of a baseline value of the surrogate parameter for congestion, a baseline value of the surrogate parameter for tissue perfusion, and a baseline value of the surrogate parameter for blood pressure; and determine the heart failure status of the patient based on the comparison.

This summary is intended to provide an overview of the subject matter described in this disclosure. It is not intended to provide an exclusive or exhaustive explanation of the apparatus and methods described in detail within the accompanying drawings and description below. The details of one or more aspects of the disclosure are set forth in the accompanying drawings and the description below.

BRIEF DESCRIPTION OF DRAWINGS

The details of one or more examples of this disclosure are set forth in the accompanying drawings and the description below. Other features, objects, and advantages of this disclosure will be apparent from the description and drawings, and from the claims.

FIGS. 4A and 4B are block diagrams illustrating other example leadless implantable medical devices substantially similar to the implantable medical device of FIG. 1;

DETAILED DESCRIPTION

Figure 1:
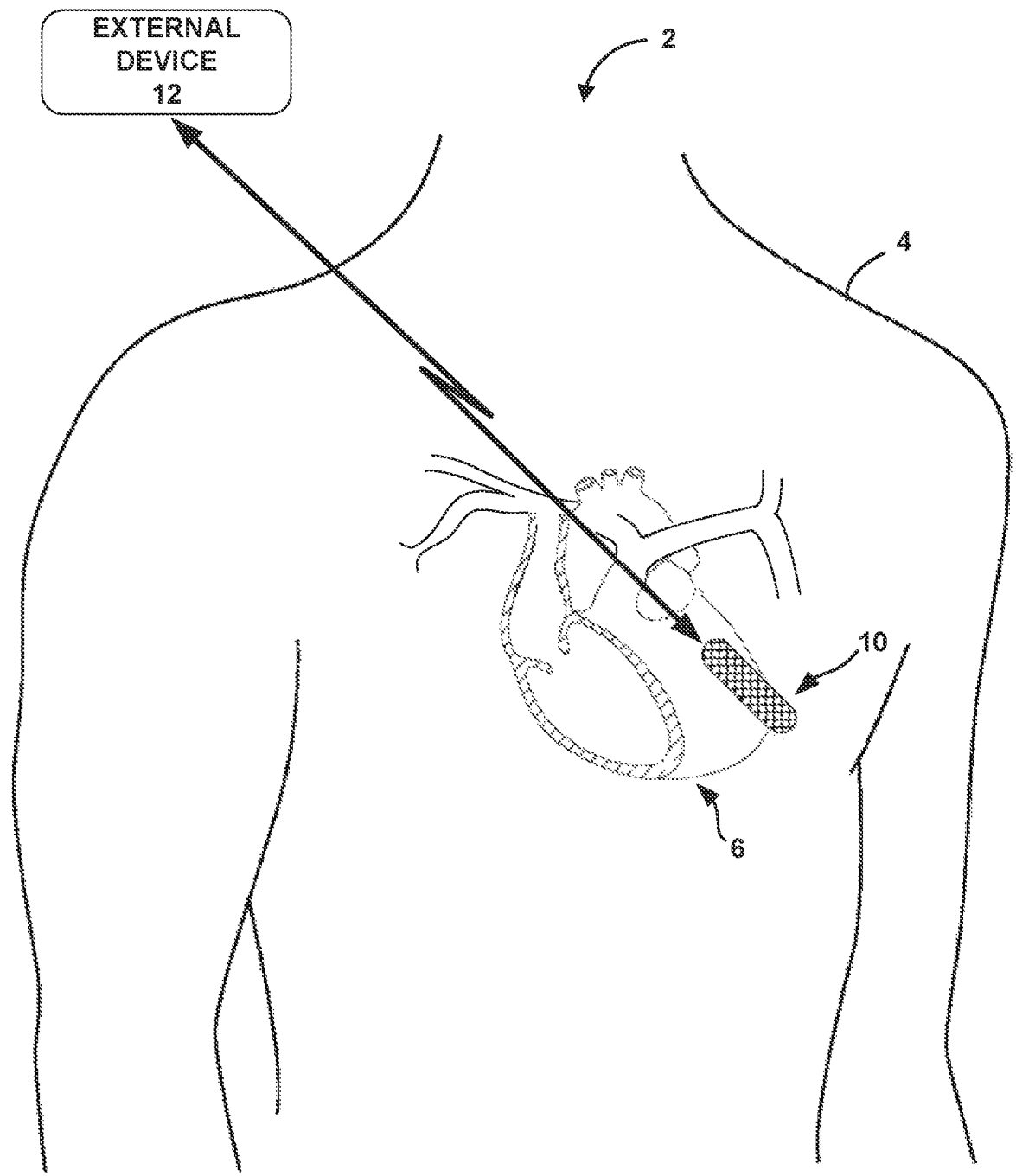
FIG. 1 is a conceptual drawing illustrating an example of a medical device system including a leadless implantable medical device and an external device in conjunction with a patient.

In general, this disclosure describes example techniques related to determining a heart failure status of a patient based on physiological parameters associated with cardiac function monitored by one or more medical devices. A subcutaneous IMD may be used in some examples of the techniques, and may be configured for placement under the skin of a patient's torso, such as between the skin and a pectoral muscle. In some examples, processing circuitry may determine current Z, $StO_2$, and PTT values of the patient based on signals detected by a plurality of electrodes and one or more optical sensors, e.g., of the subcutaneous IMD. In some examples, the IMD may be leadless, and the optical sensors and electrodes may be integrated with and/or connected to a housing of the IMD.

The processing circuitry may compare the current Z, $StO_2$, and PTT values to corresponding baseline values, which may be stored in a memory of the IMD. Based on differences between the current values and the baseline values, the processing circuitry may determine a current hemodynamic profile of a heart failure status of the patient. For example, the processing circuitry may determine that a change in the patient's cardiac function and/or compensation status has occurred, and transmit the heart failure status to a remote computer. It is further contemplated that, in some examples, the remote computer may transmit instructions for medical intervention to a user device based on the heart failure status.

Techniques that monitor one or more aspects of cardiac function, such as by measuring transthoracic impedance and/or PTT, do not provide a robust assessment of a patient's heart failure status that may be obtained by a combined assessment of Z, $StO_2$, and PTT. Indeed, two patients with hemodynamic profile that vary by one of these three parameters may have different heart failure statuses, and thus different treatment requirements. For example, the two patients each may have impedance and PTT values that reflect congestion and non-vasoconstriction. However, an $StO_2$ value of the first patient may reflect adequate peripheral perfusion, whereas an $StO_2$ value of the second patient may reflect inadequate peripheral perfusion. The hemodynamic profile of the first patient thus may be characterized as "warm and wet" (i.e., adequately perfused and congested), whereas the profile of the second patient is "cold and wet" (i.e., inadequately perfused and congested). Prognosis and the treatment requirements of these two patients differ based on their differing peripheral perfusion statuses. For example, the "cold and wet" patient may be at higher risk of acute decompensation and require a downward titration of a beta-blocker drug to help increase heart rate, whereas a different treatment modification may be required for the "warm and wet" patient. Thus, monitoring of only tissue impedance and/or PTT may be inadequate to fully assess a patient's heart failure status for the purpose of predicting adverse medical events (e.g., acute decompensation or hospitalization) and identifying appropriate treatment options.

Various techniques for monitoring cardiac function may be more or less invasive and/or prone to inaccuracy. For example, sensing transthoracic impedance values or producing an ECG with signals obtained from electrodes on leads placed within the thoracic cavity, such as within the heart, may be more invasive than sensing parameters, e.g., Z, $StO_2$, and PTT, via a subcutaneous IMD. Some methods may use electrodes or optical sensors positioned at peripheral sites on the patient to monitor parameters such as PTT. However, values determined based on signals from peripherally-located sensors may be more prone to motion artifacts generated by patient movement than values determined by sensors placed centrally, e.g., subcutaneously outside the thorax. In addition, peripheral sensor based PTT measurement techniques may require multiple measuring devices to be synchronized together, which may provide additional opportunities for measurement inaccuracy. Moreover, while other methods for monitoring cardiac function may include generating an alert if a measurement satisfies a threshold, a limitation of such methods is that they do not include providing instructions to the patient for a medical intervention based on such alerts.

In some example techniques described herein, a patient's hemodynamic profile and heart failure status may be determined using a subcutaneous implantable device configured to measure all three of Z, $StO_2$, and PTT from a single location, which may be near a patient's pectoral muscle. Such measurements may be repeated at predetermined intervals, such as hourly or daily. The device then may determine a heart failure status of the patient based on current and baseline values of Z, $StO_2$, and PTT, and transmit the heart failure status via wireless communication to a remote computer, which then may transmit instructions for medical intervention to a user device (e.g., a smartphone or tablet, located with the patient or a caregiver). Thus, in some cases, the techniques described herein advantageously may provide robust and accurate assessment of a patient's heart failure status at regular intervals and enable modification of a patient's treatment between clinician visits, which in turn may provide improved clinical outcomes.

FIG. 1 illustrates the environment of an example medical device system 2 in conjunction with a patient 4 and a heart 6, in accordance with an apparatus and method of certain examples described herein. The example techniques may be used with a leadless subcutaneously-implantable medical device (IMD) 10, which may be in wireless communication with external device 12. In some examples, IMD 10 may be implanted outside of a thoracic cavity of patient 4 (e.g., subcutaneously in the pectoral location illustrated in FIG. 1). IMD 10 may be positioned near the sternum near or just below the level of heart 6, e.g., at least partially within the cardiac silhouette. In some examples, IMD 10 may take the form of a Reveal LINQ™ Insertable Cardiac Monitor (ICM), available from Medtronic plc, of Dublin, Ireland. External device 12 may be a computing device configured for use in settings such as a home, clinic, or hospital, and may further be configured to communicate with IMD 10 via wireless telemetry. For example, external device 12 may be coupled to a remote patient monitoring system, such as Carelink®, available from Medtronic plc, of Dublin, Ireland. External device 12 may, in some examples, comprise a programmer, an external monitor, or a consumer device such as a smart phone or tablet.

IMD 10 may include a plurality of electrodes and one or more optical sensors, which collectively detect signals that enable processing circuitry, e.g., of the IMD 10, to determine current values of subcutaneous Z, $StO_2$, and PTT for patient 4, and determine a heart failure status of patient 4 based on such values. For example, the plurality of electrodes may be configured to detect a signal indicative of a Z value of the extracellular or extra-vascular fluid in the tissue surrounding and the IMD 10. Thus, in some examples, a Z value may indicate the presence of peripheral edema as a consequence of congestion. Processing circuitry of IMD 10 may use the Z value of the tissue surrounding the IMD to determine a congestion status of patient 4. In some examples, processing circuitry of IMD 10 also may use the Z value in conjunction with an ECG signal detected by the plurality of electrodes to determine a PTT value of patient 4. In other examples, processing circuitry of IMD 10 may use signals detected by one or more optical sensors positioned on a surface of IMD 10 to determine a PTT value in conjunction with the ECG signal. Processing circuitry of IMD 10 also may use signals detected by the one or more optical sensors to determine an $StO_2$ value of patient 4.

After determining current values for Z, $StO_2$, and PTT of patient 4, processing circuitry, e.g., of IMD 10, may compare such current values to corresponding baseline values, e.g., stored in a memory of IMD 10, to determine differences therebetween. If the differences between one or more of the current and corresponding baseline values satisfies a threshold, then the processing circuitry may determine that a heart failure status of patient 4 has changed relative to a time when the baseline values were established. Regardless of whether any such differences satisfy a threshold, IMD 10 then may wirelessly transmit the heart failure status of patient 4 to external device 12. The heart failure status may include a diagnostic score of patient 4, which may be associated with a likelihood that patient 4 will acutely decompensate and require hospitalization within a certain period of time. IMD 10 may transmit a heart failure status of patient 4 to external device 12 at predetermined intervals, such as daily, weekly, or at any other desired period.

In some examples, an interval at which IMD 10 determines a heart failure status of patient 4 is the same as an interval at which IMD 10 transmits the heart failure status to external device 12. In other examples, IMD 10 may determine a heart failure status of patient 4 more frequently than IMD 10 transmits a heart failure status to external device 12. By determining a heart failure status more often than a heart failure status is transmitted, an accuracy of a technique for determining a heart failure status may be enhanced by eliminating outlier measurements. For example, IMD 10 may determine that a difference between a current Z, $StO_2$, or PTT of patient 4 and a corresponding baseline satisfies a threshold only if a certain number or proportion of preceding results satisfied the threshold. In other examples, a single incident in which a current value satisfied a threshold may suffice to cause IMD 10 to determine that a change in heart failure status of patient 4 has occurred. In some examples, a clinician may configure a sensitivity of IMD 10 to certain types of values that satisfy a threshold at or after the time of implant of IMD 10, depending on factors such as the individual condition of patient 4. As discussed below, several aspects of the operation of IMD 10 may be configured by a clinician to help achieve improved monitoring and clinical outcomes for individual patients such as patient 4.

At or after the time of implantation of IMD 10 into the subcutaneous location illustrated in FIG. 1, a clinician may configure one or more aspects of IMD 10. In some examples, a clinician may establish baseline values of Z, $StO_2$, and PTT using conventional assessments. For example, the clinician may use stethoscope to listen for congestion, conduct arterial and venous blood draws with co-oximeter measurements to assess perfusion, and apply a blood pressure cuff to approximate vascular resistance. In addition, the clinician may complete a standard examination and assessment of patient 4's congestion, peripheral perfusion, and vascular resistance statuses. For example, the clinician may identify whether, and to what extent, congestion is present. The clinician then may use an application on a tablet or other smart device to enter empirically-determined baseline values of Z, $StO_2$, and PTT into a memory of the IMD 10, along with patient 4's status with respect to congestion, peripheral perfusion, and vascular resistance.

In other examples, instead of determining baseline values for Z, $StO_2$, and PTT using the conventional assessment noted above, a clinician may conduct the standard examination and assessment of patient 4's congestion, peripheral perfusion, and vascular resistance statuses. Based on the outcome of this assessment, and optionally on other data corresponding to patient 4, the clinician may select baseline values of Z, $StO_2$, and PTT for patient 4. Lists or tables of such values may be presented by the app on the clinician tablet or other smart device, or may be available from a centralized database. Once the clinician has selected appropriate baseline values for patient 4, he or she may use the app to store the values in IMD 10.

In still other examples, IMD 10 may be configured to undertake a learning phase after implantation into patient 4, in which IMD 10 determines the baseline values of Z, $StO_2$, and PTT (where the baseline value PTT is determined based on a baseline cardiac electrogram signal plus a baseline optical signal or a baseline Z) for patient 4 based on values collected by IMD 10 over a period of time, and stores the values in a memory of IMD 10. For example, IMD 10 may measure Z, $StO_2$, and PTT on a relatively frequent basis (e.g., hourly or several times a day) for a period of time (e.g., a week or more) to determine baseline values during a period when the condition of patient 4 is stable and not acutely decompensating.

Because heart failure is a progressive disease, values for baselines, thresholds, and event identifiers associated with patient 4 also may be updated periodically. For example, IMD 10 may undertake a new learning phase monthly, quarterly, yearly, or at an expiration of any other appropriate period. The new learning phase may produce new values associated with one or more of the baselines, thresholds, and evidence levels based on an updated heart failure status of patient 4. In other examples, a clinician may program IMD 10 to update such values as needed, such as following a health event experienced by patient 4 that may affect the applicability of such values to patient 4's heart failure status.

In some examples, IMD 10 may determine baseline values based on averages of the Z, $StO_2$, and PTT values collected during the training period. In other examples, IMD 10 may reject outlier values collected during the training period prior to determining the baseline values, although IMD may use other methods of determining baseline values from collected values. In some examples in which IMD 10 uses a training period to determine the baseline values, a clinician also may conduct the standard examination and assessment of congestion, peripheral perfusion, and vascular resistance statuses of patient 4, and store the values in IMD 10.

In addition to determining baseline values of Z, $StO_2$, and PTT for patient 4, IMD 10 or a clinician also may determine threshold values of Z, $StO_2$, and PTT for patient 4 and store the threshold values in a memory of IMD 10. In some examples, a threshold value may be indicative of a value of a difference between a current value of one of Z, $StO_2$, or PTT and a corresponding baseline value that indicates that a heart failure status of patient 4 may have changed. For example, a determination by IMD 10 of a heart failure status of patient 4 may be based, at least in part, on whether any of the differences between the current values of Z, $StO_2$, or PTT and the corresponding baseline values satisfy a threshold value.

IMD 10 may determine threshold values for each of a number of different baseline values for each of Z, $StO_2$, and PTT, such as during the training period of IMD 10. In some examples, IMD 10 may automatically associate a particular threshold value with a particular baseline value of one of Z, $StO_2$, or PTT for patient 4. In other examples, IMD 10 may determine a threshold value for the one of Z, $StO_2$, or PTT based in part on the values of the other baselines determined for patient 4. For example, if a baseline Z value of patient 4 indicates that patient 4 is congested, IMD 10 may select a lower threshold value for $StO_2$ than if the baseline Z value does not indicate that patient 4 is congested. In this way, IMD 10's determinations of heart failure status may be more sensitive for patients that are at a higher overall risk for acute decompensation, or for whom acute decompensation may have greater health consequences. In other examples, a clinician may choose to program IMD 10 to apply relatively higher or lower thresholds than those selected by processing circuitry of IMD 10 based on other considerations known to the clinician.

Regardless of whether the threshold values for Z, $StO_2$, and PTT are determined by processing circuitry of IMD 10 during a training period or by a clinician, such threshold values may be updated at one or more times after implantation of IMD 10. For example, threshold values may be updated after patient 4 experiences an acute decompensation or hospitalization event, which may indicate that one or more parameters of a heart failure condition of patient 4 has progressed or otherwise changed. Or, the threshold values may be updated at the expiration of a time period (e.g., weekly, monthly, or yearly following implantation of IMD 10). Such updates to the threshold values may be performed automatically by processing circuitry of IMD 10, or manually by a clinician. In any such examples, the updated threshold values may be determined based on trends in one or more of the current values of Z, $StO_2$, and PTT during the preceding time period. In this manner, the threshold values used in the techniques described herein may be modified as needed to account for changes in patient 4's hemodynamic profile.

In addition to determining whether the differences between any current values of Z, $StO_2$, or PTT and corresponding baseline values satisfy one or more threshold values, IMD 10 also may determine a diagnostic score for patient 4 based on the current values of Z, $StO_2$, and PTT. A diagnostic score may be a value (e.g., a numeric value) that is associated with a likelihood that patient 4 will acutely decompensate and/or require hospitalization within a certain period of time, regardless of whether the differences between any current values of Z, $StO_2$, or PTT and corresponding baseline values satisfy one or more threshold values. In some examples, a diagnostic score of patient 4 may be further increased if one or more such differences satisfy a threshold value.

IMD 10 may determine a diagnostic score of patient 4 based, at least in part, on values of evidence levels that may be associated with values of various parameters of heart failure. In some examples, such evidence levels may be determined based on assessments of one or more populations of patients with heart failure conditions. Diagnostic scores may comprise one or more values associated with one or more evidence levels, with each evidence level being associated with a value of a parameter of heart failure. For example, assessments of patient populations may classify parameters (e.g., congestion, inadequate perfusion, vasoconstriction/vasodilation) as occurring at varying levels of severity. Each level of severity of each parameter may be characterized as an "evidence level" associated with a numerical value, and patient outcomes (e.g., prior patient population data) for each evidence level may be documented. In light of patient outcomes, the numerical values associated with the evidence levels may be weighted to reflect their predictive value of patient outcome.

IMD 10 may determine a diagnostic score associated with a heart failure status of patient 4 based on a combination of the evidence levels associated with the current values of Z, $StO_2$, and PTT of patient 4. For example, the diagnostic score may be based on an integration of prior population data (e.g., data associated with the evidence levels) with measurements specific to patient 4 (e.g., the current values of Z, $StO_2$, or PTT of patient 4), such as by using Bayesian statistics or other methods of machine learning. In some examples, an algorithm trained using clinician-scored, prior population data is applied to patient-specific measurements of parameters, such as the current values of Z, $StO_2$, or PTT, to determine a diagnostic score. In some examples, a diagnostic score determined based on a combination of evidence levels may indicate a likelihood that patient 4 underwent a change in each of the corresponding parameters of heart failure associated with the evidence levels. For example, an evidence level associated with a current value of Z may indicate an X % chance that patient 4 underwent a change in congestion status during a preceding time period on which the diagnostic score is based. Similarly, an evidence level associated with a current value of $StO_2$ or PTT may indicate a Y % or Z % chance that patient 4 underwent a change in respective ones of a tissue perfusion or blood pressure status during the preceding time period. In some examples, the diagnostic score may be adjusted upward or downward based on how many of the differences between the current values of patient 4 and the corresponding baseline values satisfy associated thresholds. In addition, a clinician may manually modify weights assigned by IMD 10 to evidence levels for different measured parameters, depending on an individual condition or medical history of patient 4. For example, the clinician may manually modify one or more of the weights assigned by IMD 10 based on events in the medical history of patient 4 such as hospital admissions for heart failure, medication changes, history of systolic heart failure, hypertension, respiratory illness (e.g., COPD), diabetes, atrial fibrillation, renal failure, one or more blood disorders (e.g., anemia), one or more sleep disorders (e.g., sleep apnea), among others. In any such examples, the evidence levels associated with the parameters of Z, $StO_2$, and PTT may be stored in a memory of IMD 10.

In some examples, a diagnostic score, as described above, may be a baseline diagnostic score associated with a heart failure status of patient 4. Because heart failure is a progressive disease, IMD 10 periodically may determine an updated heart failure status of patient 4 at regular intervals. In some examples, IMD 10 may determine an updated heart failure status of patient 4 by iteratively performing the methods described above. In other examples, an updated heart failure status of patient 4 determined by IMD 10 may be based, at least in part, on a determination of a current diagnostic score of patient 4 and a comparison of the current diagnostic score to a previously-determined diagnostic score of patient 4 (e.g., a baseline diagnostic score).

In such examples, IMD 10 may determine a current diagnostic score of patient 4 by combining weighted values associated with the current values of Z, $StO_2$, and PTT of patient 4. For example, IMD 10 may determine a difference between current values of each of Z, $StO_2$, and PTT and the corresponding baseline values of patient 4. IMD 10 then may determine a weighted value for each of the differences between the current values and the corresponding baseline values. In some examples, IMD 10 may assign weights to the difference values based on factors such as a medical history of patient 4, which may include one or more of the medical history events described above with respect to examples in which a clinician manually modifies one or more of the weights. For example, patient 4 may have a medical history of becoming congested, which may indicate that patient 4 is prone to becoming congested in the future. Or, population-based data may indicate that patients having a same or similar profile of baseline values as patient 4 may be particularly likely to become congested (or inadequately perfused or vasoconstricted/vasodilated). In some examples, weights assigned by IMD 10 to the difference values may have negative values, such as if a medical history of patient 4 or population-based data indicate that patient 4 is unlikely to become congested (or inadequately perfused or vasoconstricted/vasodilated). IMD 10 then may combine the weighted values of the differences between the current values and the baseline values, to arrive at a current diagnostic score for patient 4.

In some examples, IMD 10 may compare the current diagnostic score to the baseline diagnostic score of patient 4, the latter of which may have been determined during a prior iteration of a method in which IMD 10 determined a heart failure status of patient 4. IMD 10 then may determine an updated heart failure status of patient 4 based on the comparison of the baseline diagnostic score to the current diagnostic score, and transmit the updated heart failure status to a remote computer (e.g., external device 12). External device 12, or another remote computer, then may transmit instructions for a medical intervention (e.g., a change in a drug regimen, or instructions to schedule a clinician visit or seek medical attention), to an interface of a user device located with patient 4.

In some examples, the baseline diagnostic score of patient 4 may be updated, in a substantially similar manner as described above with respect to the threshold values. For example, the baseline diagnostic score of patient 4 may be updated after patient 4 experiences an acute decompensation or hospitalization event, which may indicate that one or more parameters of a heart failure condition of patient 4 has progressed or otherwise changed. In some examples, the baseline diagnostic score of patient 4 may be updated at the expiration of a time period (e.g., weekly, monthly, or yearly following implantation of IMD 10). Such updates to the baseline diagnostic score of patient 4 may be performed automatically by processing circuitry of IMD 10, or manually by a clinician.

As described above, the operating parameters of IMD 10 readily may be customized to meet the needs of patient 4, such as by setting values of baselines, thresholds, and evidence levels based on the individual attributes of patient 4. The extent and ease of customizability of IMD 10 may provide numerous benefits. For example, customizability of IMD 10 to reflect a heart failure condition of patient 4 helps ensure that appropriate drug therapies are prescribed for patient 4, thereby reducing a likelihood of human error in prescribing treatment. In addition, in examples in which IMD 10 selects one or more of the baseline values, threshold values, or evidence level values for patient 4, burdens on the clinician's time may be reduced, which may reduce the time needed for an office visit and promote efficient treatment. Moreover, as discussed above, IMD 10 enables modification of heart failure treatment for patient 4 in between clinician visits, which may help avoid acute decompensation and thus lead to better clinical outcomes, such as improved quality of life for patient 4 or reduced medical expenses.

External device 12 may be used to program commands or operating parameters into IMD 10 for controlling its functioning (e.g., when configured as a programmer for IMD 10). In some examples, external device 12 may be used to interrogate IMD 10 to retrieve data, including device operational data as well as physiological data accumulated in IMD memory. Such interrogation may occur automatically according to a schedule, or may occur in response to a remote or local user command. Programmers, external monitors, and consumer devices are examples of external devices 12 that may be used to interrogate IMD 10. Examples of communication techniques used by IMD 10 and external device 12 include radiofrequency (RF) telemetry, which may be an RF link established via Bluetooth, WiFi, or medical implant communication service (MICS). In some examples, external device 12 may include a user interface configured to allow a clinician to remotely interact with IMD 10.

Medical system 2 is an example of a medical device system configured to monitor a heart failure status of patient 4 and facilitate updates to heart-failure treatment of patient 4 as needed between clinician visits. The techniques described herein may be performed by processing circuitry of a device of medical system 2, such as processing circuitry of IMD 10. Additionally, or alternatively, the techniques described herein may be performed, in whole or in part, by processing circuitry of external device 12, and/or by processing circuitry of one or more other implanted or external devices or servers not shown. Examples of the one or more other implanted or external devices may include a transvenous, subcutaneous, or extravascular pacemaker or implantable cardioverter-defibrillator (ICD), a blood analyzer, an external monitor, or a drug pump. The communication circuitry of each of the devices of system 2 allows the devices to communicate with one another. In addition, although the optical sensors and electrodes are described herein as being positioned on a housing of IMD 10, in other examples, such optical sensors and/or electrodes may be positioned on a housing of another device implanted in or external to patient 4, such as a transvenous, subcutaneous, or extravascular pacemaker or ICD, or coupled to such a device by one or more leads. For example, in cases in which patient 4 has an implanted pacemaker or ICD, the techniques described herein may include sensing signals for determining Z with electrodes on the pacemaker or ICD. In such examples, electrodes or one or more optical sensors for detecting signals associated with $StO_2$ and PTT may be positioned on one or more external monitoring devices (e.g., a wearable monitor). In such examples, one or more of the pacemaker/ICD and the one or more external monitoring devices may include processing circuitry configured to receive signals from the electrodes or optical sensors on the respective devices and/or communication circuitry configured to transmit the signals from the electrodes or optical sensors to another device (e.g., external device 12) or server.

In some examples, medical system 2 may be configured to monitor one or more parameters in addition to or instead of any of Z, $StO_2$, and PTT. For example, sensors on IMD 10 or one or more other implanted or external devices may be configured to sense signals associated with such parameters. Such one or more parameters may be associated with physiological functions of patient 4, such as kidney function, which may change when a heart failure status of patient 4 changes. For example, one or more implanted or external devices of medical system 2 (e.g., IMD 10) may include one or more sensors configured to sense blood or tissue levels of one or more compounds associated with kidney function of patient 4, such as creatinine or blood urea nitrogen. In such examples, techniques for determining a heart failure status of patient 4 may include determining, by processing circuitry of IMD 10, external device 12, or one or more other implanted or external devices or servers, a current value of the one or more parameters in addition to or instead of any of Z, $StO_2$, and PTT, comparing such a current value to a corresponding baseline, and using the comparison in determining the heart failure status of patient 4. In some examples, such one or more parameters may not be directly associated with changes in a heart failure status, but may provide other information about the health of patient 4, such as activity levels or sleep patterns.

Figure 2:
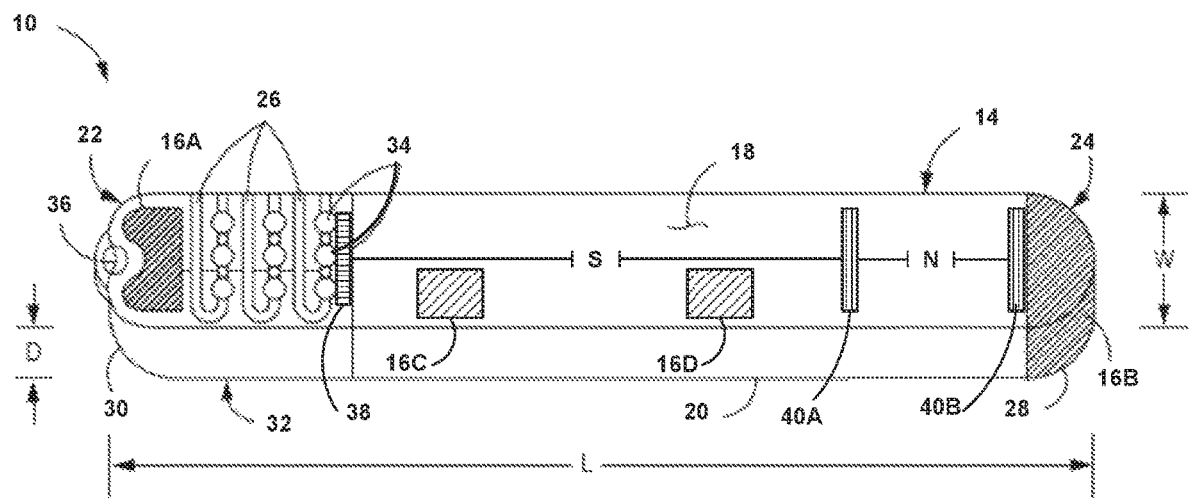
FIG. 2 is a conceptual drawing illustrating an example configuration of the leadless implantable medical device of the medical device system of FIG. 1.
Figure 3:
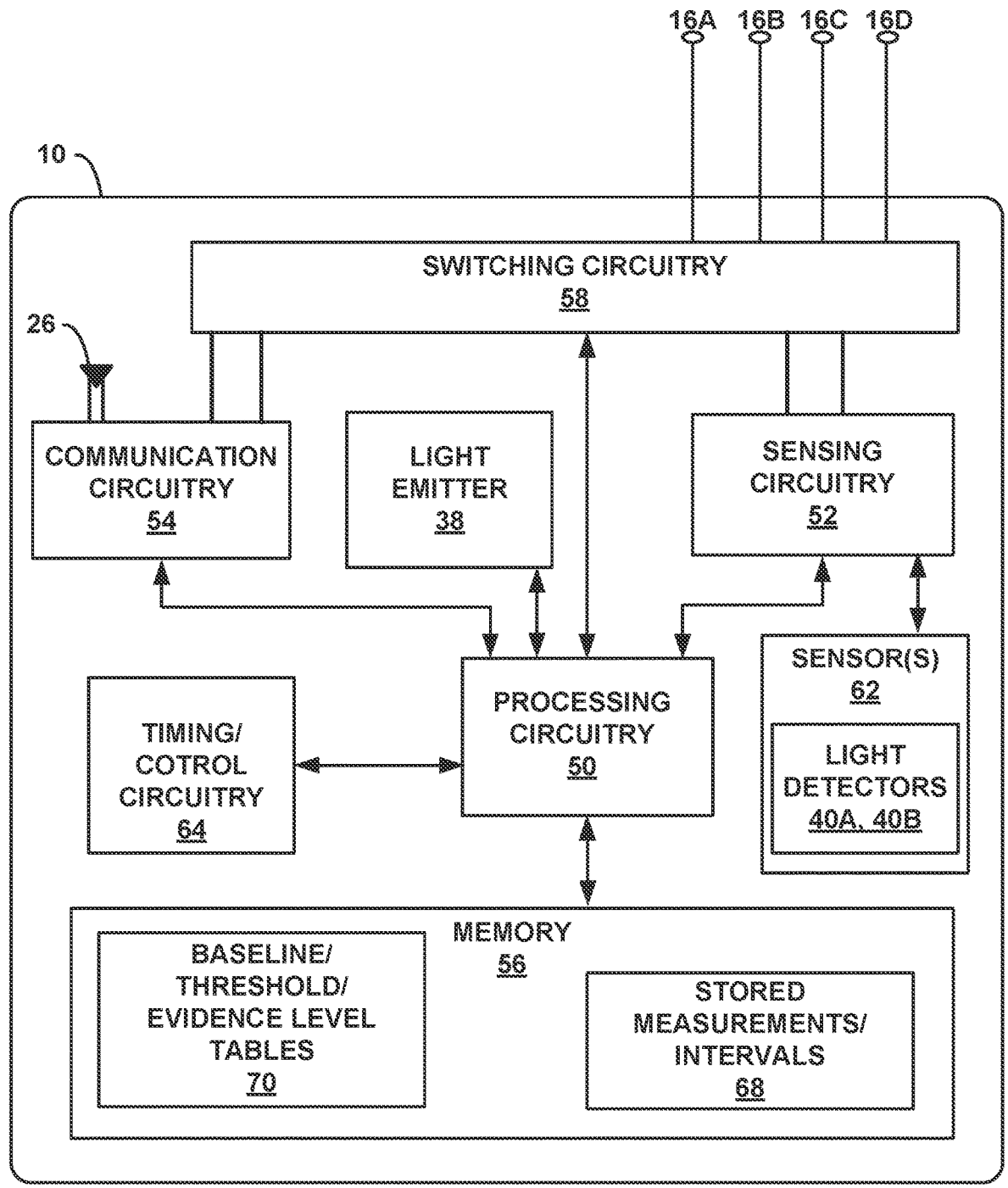
FIG. 3 is a functional block diagram illustrating another perspective of the example configuration of the leadless implantable medical device of FIG. 1.
Figure 4A:
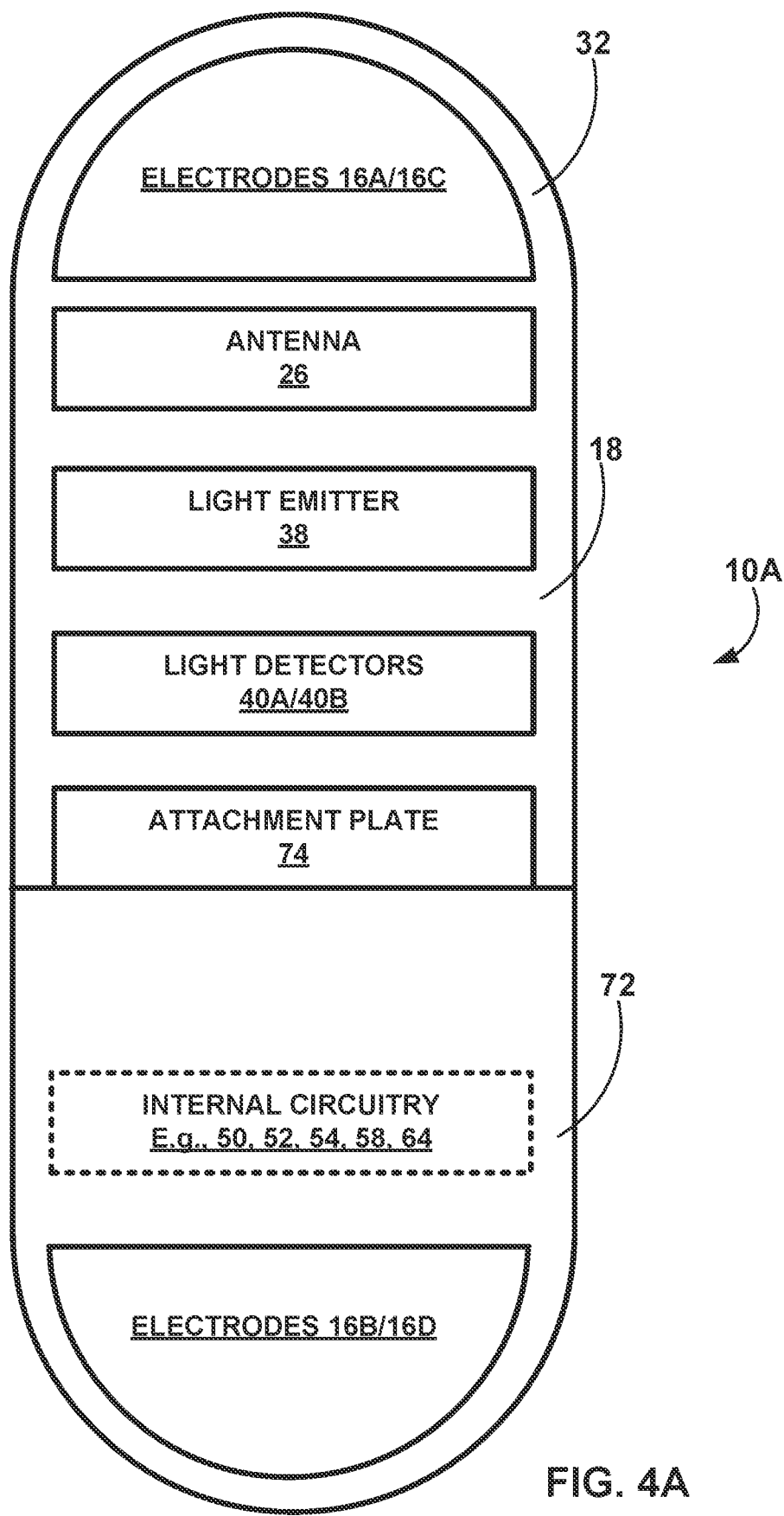

FIGS. 2-4B illustrate various aspects and example arrangements of IMD 10 of FIG. 1. For example, FIG. 2 conceptually illustrates an example physical configuration of IMD 10. FIG. 3 is a block diagram illustrating an example functional configuration of IMD 10. FIGS. 4A and 4B illustrate additional views of an example physical and functional configuration of IMD 10. It should be understood that any of the examples of IMD 10 described below with respect to FIGS. 2-4B may be used to implement the techniques described herein for determining a heart failure status of patient 4.

FIG. 2 is a conceptual drawing illustrating an example configuration of IMD 10 of FIG. 1. In the example shown in FIG. 2, IMD 10 may comprise a leadless, subcutaneously-implantable monitoring device having housing 14, proximal electrode 16A, and distal electrode 16B. Housing 14 may further comprise first major surface 18, second major surface 20, proximal end 22, and distal end 24. In some examples, IMD 10 may include one or more additional electrodes 16C, 16D positioned on one or both of major surfaces 18,20 of IMD 10. Housing 14 encloses electronic circuitry located inside the IMD 10, and protects the circuitry contained therein from fluids such as body fluids. In some examples, electrical feedthroughs provide electrical connection of electrodes 16A-16D, and antenna 26, to circuitry within housing 14. In some examples, electrode 16B may be formed from an uninsulated portion of conductive housing 14.

In the example shown in FIG. 2, IMD 10 is defined by a length L, a width W, and thickness or depth D. In this example, IMD 10 is in the form of an elongated rectangular prism in which length L is significantly greater than width W, and in which width W is greater than depth D. However, other configurations of IMD 10 are contemplated, such as those in which the relative proportions of length L, width W, and depth D vary from those described and shown in FIG. 2. In some examples, the geometry of the IMD 10, such as the width W being greater than the depth D, may be selected to allow IMD 10 to be inserted under the skin of the patient using a minimally invasive procedure and to remain in the desired orientation during insertion. In addition, IMD 10 may include radial asymmetries (e.g., the rectangular shape) along a longitudinal axis of IMD 10, which may help maintain the device in a desired orientation following implantation.

In some examples, a spacing between proximal electrode 16A and distal electrode 16B may range from about 30-55 mm, about 35-55 mm, or about 40-55 mm, or more generally from about 25-60 mm. Overall, IMD 10 may have a length L of about 20-30 mm, about 40-60 mm, or about 45-60 mm. In some examples, the width W of major surface 18 may range from about 3-10 mm, and may be any single width or range of widths between about 3-10 mm. In some examples, a depth D of IMD 10 may range from about 2-9 mm. In other examples, the depth D of IMD 10 may range from about 2-5 mm, and may be any single or range of depths from about 2-9 mm. In any such examples, IMD 10 is sufficiently compact to be implanted within the subcutaneous space of patient 4 in the region of a pectoral muscle.

IMD 10, according to an example of the present disclosure, may have a geometry and size designed for ease of implant and patient comfort. Examples of IMD 10 described in this disclosure may have a volume of 3 cubic centimeters ($cm^3$) or less, 1.5 $cm^3$ or less, or any volume therebetween. In addition, in the example shown in FIG. 2, proximal end 22 and distal end 24 are rounded to reduce discomfort and irritation to surrounding tissue once implanted under the skin of patient 4. In some examples, a configuration of IMD 10, including instrument and method for inserting IMD 10 is described, for example, in U.S. Patent Publication No. 2014/0276928, incorporated herein by reference in its entirety. In some examples, a configuration of IMD 10 is described, for example, in U.S. Patent Publication No. 2016/0310031, incorporated herein by reference in its entirety.

In the example shown in FIG. 2, first major surface 18 of IMD 10 faces outward towards the skin, when IMD 10 is inserted within patient 4, whereas second major surface 20 is faces inward toward musculature of patient 4. Thus, first and second major surfaces 18, 20 may face in directions along a sagittal axis of patient 4 (see FIG. 1), and this orientation may be maintained upon implantation due to the dimensions of IMD 10.

Proximal electrode 16A and distal electrode 16B may be used to sense cardiac EGM signals (e.g., ECG signals) when IMD 10 is implanted subcutaneously in patient 4. In the techniques described herein, processing circuitry of IMD 10 may determine a PTT value based in part on cardiac ECG signals, as further described below. In some examples, processing circuitry of IMD 10 also may determine whether cardiac ECG signals of patient 4 are indicative of arrhythmia or other abnormalities, which processing circuitry of IMD 10 may evaluate in determining whether a heart failure status of patient 4 has changed. The cardiac ECG signals may be stored in a memory of the IMD 10, and data derived from the cardiac ECG signals may be transmitted via integrated antenna 26 to another medical device, such as external device 12. In some examples, one or both of electrodes 16A and 16B also may be used to detect subcutaneous impedance value Z for assessing a congestion status of patient 4, and/or may be used by communication circuitry of IMD 10 for TCC communication with external device 12.

In the example shown in FIG. 2, proximal electrode 16A is in close proximity to proximal end 22, and distal electrode 16B is in close proximity to distal end 24 of IMD 10. In this example, distal electrode 16B is not limited to a flattened, outward facing surface, but may extend from first major surface 18, around rounded edges 28 or end surface 30, and onto the second major surface 20 in a three-dimensional curved configuration. As illustrated, proximal electrode 16A is located on first major surface 18 and is substantially flat and outward facing. However, in other examples not shown here, proximal electrode 16A and distal electrode 16B both may be configured like proximal electrode 16A shown in FIG. 2, or both may be configured like distal electrode 16B shown in FIG. 2. In some examples, additional electrodes 16C and 16D may be positioned on one or both of first major surface 18 and second major surface 20, such that a total of four electrodes are included on IMD 10. Any of electrodes 16A-16D may be formed of a biocompatible conductive material. For example, any of electrodes 16A-16D may be formed from any of stainless steel, titanium, platinum, iridium, or alloys thereof. In addition, electrodes of IMD 10 may be coated with a material such as titanium nitride or fractal titanium nitride, although other suitable materials and coatings for such electrodes may be used.

In the example shown in FIG. 2, proximal end 22 of IMD 10 includes header assembly 32 having one or more of proximal electrode 16A, integrated antenna 26, anti-migration projections 34, and suture hole 36. Integrated antenna 26 is located on the same major surface (e.g., first major surface 18) as proximal electrode 16A, and may be an integral part of header assembly 32. In other examples, integrated antenna 26 may be formed on the major surface opposite from proximal electrode 16A, or, in still other examples, may be incorporated within housing 14 of IMD 10. Antenna 26 may be configured to transmit or receive electromagnetic signals for communication. For example, antenna 26 may be configured to transmit to or receive signals from a programmer via inductive coupling, electromagnetic coupling, tissue conductance, Near Field Communication (NFC), Radio Frequency Identification (RFID), Bluetooth, WiFi, or other proprietary or non-proprietary wireless telemetry communication schemes. Antenna 26 may be coupled to communication circuitry of IMD 10, which may drive antenna 26 to transmit signals to external device 12, and may transmit signals received from external device 12 to processing circuitry of IMD 10 via communication circuitry.

IMD 10 may include several features for retaining IMD 10 in position once subcutaneously implanted in patient 4. For example, as shown in FIG. 2, housing 14 may include anti-migration projections 34 positioned adjacent integrated antenna 26. Anti-migration projections 34 may comprise a plurality of bumps or protrusions extending away from first major surface 18, and may help prevent longitudinal movement of IMD 10 after implantation in patient 4. In other examples, anti-migration projections 34 may be located on the opposite major surface as proximal electrode 16A and/or integrated antenna 26. In addition, in the example shown in FIG. 2 header assembly 32 includes suture hole 36, which provides another means of securing IMD 10 to the patient to prevent movement following insertion. In the example shown, suture hole 36 is located adjacent to proximal electrode 16A. In some examples, header assembly 32 may comprise a molded header assembly made from a polymeric or plastic material, which may be integrated or separable from the main portion of IMD 10.

Electrodes 16A and 16B may be used to sense cardiac ECG signals for PTT value determination, as described above. Additional electrodes 16C and 16D may be used to sense subcutaneous tissue impedance (e.g., either for measuring Z and/or for measuring PTT), in addition to or instead of electrodes 16A, 16B, in some examples. In some cases, it may be advantageous to use separate electrode pairs for determining the current Z and PTT values of patient 4. For example, using separate electrodes 16A, 16B for impedance measurement and electrodes 16C, 16D for ECG sensing may help reduce a likelihood that a signal generated for determining a Z value may interfere with signals sensed by electrodes 16C, 16D during the sensing of cardiac ECG signals. In addition, using separate electrode pairs for determining current Z and PTT values of patient 4 may better enable adaptation of one or more aspects of electrodes 16A-16D (e.g., size or spacing) to the assigned function of each electrode.

In some examples, processing circuitry of IMD 10 may determine a Z value of patient 4 based on signals received from at least two of electrodes 16A-16D. For example, processing circuitry of IMD 10 may generate one of a current or voltage signal, deliver the signal via a selected two or more of electrodes 16A-16D, and measure the resulting other of current or voltage. Processing circuitry of IMD 10 may determine an impedance signal based on the delivered current or voltage and the measured voltage or current.

In some examples, processing circuitry of IMD 10 may determine a PTT value of patient 4 based on the sensed ECG signal from electrodes 16A, 16B and the current value of Z based on signals received from electrodes 16C and 16D. For example, the processing circuitry of IMD 10 may receive the ECG signal from electrodes 16A, 16B, and identify one or more features of a cardiac cycle within the ECG signal. The processing circuitry may identify an R wave within a cardiac cycle, and associate a first time (T1) with the occurrence of the R wave. Next, the processing circuitry may identify a fluctuation in the subcutaneous tissue impedance signal occurring after T1, and associate a second time (T2) with the fluctuation, which may represent the passing of blood ejected during the observed cardiac cycle through the portion of the vasculature near electrodes 16C, 16D. By subtracting T2 from T1, processing circuitry of IMD 10 then may determine a PTT value (e.g., in milliseconds) of patient 4. To enable IMD 10 to accurately identify fluctuations in PTT values of patient 4, it may be beneficial for a clinician to implant IMD 10 substantially as shown in FIG. 1, with at least a portion of IMD 10 positioned at or inferior to heart 6. In this way, IMD 10 may be positioned at a sufficient circulatory distance from heart 6 to detect even small fluctuations in PTT, which may help IMD 10 to accurately assess a heart failure status of patient 4.

In some other examples, techniques for determining PTT may include using light emitter 38 to emit light at one or more wavelengths, e.g., one or more visible (VIS) wavelengths (e.g., approximately 600 nanometers (nm)) and/or one or more near-infrared (NIR) wavelengths (e.g., approximately 850-890 nm) in addition to the sensed ECG signal from electrodes 16A, 16B. In such examples, processing circuitry of IMD 10 controls light emitter 38 to emit light at the one or more wavelengths, such as a NIR or VIS wavelength, and concurrently monitor the sensed ECG signal. The processing circuitry may identify an R wave within a cardiac cycle and associate a first time (T1) with the occurrence of the R wave. Next, the processing circuitry may identify a fluctuation in the light detected by light detectors 40A, 40B occurring after T1, and associate a second time (T2) with the fluctuation, which may represent the passing of blood ejected during the observed cardiac cycle through the portion of the vasculature near light detectors 40A, 40B. By subtracting T2 from T1, processing circuitry of IMD 10 then may determine a PTT value (e.g., in milliseconds) of patient 4.

In the example shown in FIG. 2, IMD 10 includes a light emitter 38, a proximal light detector 40A, and a distal light detector 40B positioned on housing 14 of IMD 10. Light detector 40A may be positioned at a distance S from light emitter 38, and a distal light detector 40B positioned at a distance S+N from light emitter 38. In other examples, IMD 10 may include only one of light detectors 40A, 40B, or may include additional light emitters and/or additional light detectors. Collectively, light emitter 38 and light detectors 40A, 40B may comprise an optical sensor, which may be used in the techniques described herein to determine $StO_2$ or PTT values of patient 4. Although light emitter 38 and light detectors 40A, 40B are described herein as being positioned on housing 14 of IMD 10, in other examples, one or more of light emitter 38 and light detectors 40A, 40B may be positioned, on a housing of another type of IMD within patient 4, such as a transvenous, subcutaneous, or extravascular pacemaker or ICD, or connected to such a device via a lead. Light emitter 38 includes a light source, such as an LED, that may emit light at one or more wavelengths within the (VIS) and/or (NIR) spectra. For example, light emitter 38 may emit light at one or more of about 660 (nm), 720 nm, 760 nm, 800 nm, or at any other suitable wavelengths.

In some examples, techniques for determining $StO_2$ may include using light emitter 38 to emit light at one or more VIS wavelengths (e.g., approximately 600 nm) and at one or more NIR wavelengths (e.g., approximately 850-890 nm). The combination of VIS and NIR wavelengths may help enable processing circuitry of IMD 10 to distinguish oxygenated hemoglobin from deoxygenated hemoglobin in the tissue of patient 4, because oxygenated hemoglobin absorbs more NIR light than VIS light, whereas deoxygenated hemoglobin absorbs more VIS light than NIR light. By comparing the amount of VIS light detected by light detectors 40A, 40B to the amount of NIR light detected by light detectors 40A, 40B, processing circuitry of IMD 10 may determine the relative amounts of oxygenated and deoxygenated hemoglobin in the tissue of patient 4. For example, if the amount of oxygenated hemoglobin in the tissue of patient 4 decreases, the amount of VIS light detected by light detectors 40A, 40B increases and the amount of NIR light detected by light detectors 40A, 40B decreases. Similarly, if the amount of oxygenated hemoglobin in the tissue of patient 4 increases, the amount of VIS light detected by light detectors 40A, 40B decreases and the amount of NIR light detected by light detectors 40A, 40B increases.

As shown in FIG. 2, light emitter 38 may be positioned on header assembly 32, although, in other examples, one or both of light detectors 40A, 40B may additionally or alternatively be positioned on header assembly 32. In some examples, light emitter 38 may be positioned on a medial section of IMD 10, such as part way between proximal end 22 and distal end 24. Although light emitter 38 and light detectors 40A, 40B are illustrated as being positioned on first major surface 18, light emitter 38 and light detectors 40A, 40B alternatively may be positioned on second major surface 20. In some examples, IMD may be implanted such that light emitter 38 and light detectors 40A, 40B face inward when IMD 10 is implanted, toward the muscle of patient 4, which may help minimize interference from background light coming from outside the body of patient 4. Light detectors 40A, 40B may include a glass or sapphire window, such as described below with respect to FIG. 4B, or may be positioned beneath a portion of housing 14 of IMD 10 that is made of glass or sapphire, or otherwise transparent or translucent.

Light emitter 38 may emit light into a target site of patient 4 during a technique for determining an $StO_2$ value of patient 4. The target site may generally include the interstitial space around IMD 10 when IMD 10 is implanted in patient 4. Light emitter 38 may emit light directionally in that light emitter may direct the signal to a side of IMD 10, such as when light emitter 38 is disposed on the side of IMD 10 that includes first major surface 18. The target site may include the subcutaneous tissue adjacent IMD 10 within patient 4. In one example, light emitter 38 may deliver 180-degree light signals, such as 180 degrees along a dimension parallel to a longitudinal axis of IMD 10. In some examples, a light signal may be a cloud of light generally directed inward, toward the musculature and away from the skin of patient 4. In some examples, the light signal may take the mean free path, as the light signal may be non-directional once emitted from light emitter 38.

Techniques for determining an $StO_2$ value may be based on the optical properties of blood-perfused tissue that change depending upon the relative amounts of oxygenated and deoxygenated hemoglobin in the microcirculation of tissue. These optical properties are due, at least in part, to the different optical absorption spectra of oxygenated and deoxygenated hemoglobin. Thus, the oxygen saturation level of the patient's tissue may affect the amount of light that is absorbed by blood within the tissue adjacent IMD 10, and the amount of light that is reflected by the tissue. Light detectors 40A, 40B each may receive light from light emitter 38 that is reflected by the tissue, and generate electrical signals indicating the intensities of the light detected by light detectors 40A, 40B. Processing circuitry of IMD 10 then may evaluate the electrical signals from light detectors 40A, 40B in order to determine an $StO_2$ value of patient 4.

In some examples, a difference between the electrical signals generated by light detectors 40A, 40B may enhance an accuracy of the $StO_2$ value determined by IMD 10. For example, because tissue absorbs some of the light emitted by light emitter 38, the intensity of the light reflected by tissue becomes attenuated as the distance (and amount of tissue) between light emitter 38 and light detectors 40A, 40B increases. Thus, because light detector 40B is positioned further from light emitter 38 (at distance S+N) than light detector 40A (at distance S), the intensity of light detected by light detector 40B should be less than the intensity of light detected by light detector 40A. Due to the close proximity of detectors 40A, 40B to one another, the difference between the intensity of light detected by detector 40A and the intensity of light detected by detector 40B should be attributable only to the difference in distance from light emitter 38. In some examples, processing circuitry of IMD 10 may use the difference between the electrical signals generated by light detectors 40A, 40B, in addition to the electrical signals themselves, in determining an $StO_2$ value of patient 4.

As noted above, light emitter 38 and one or both of light detectors 40A, 40B also may be used in a technique for determining a PTT value of patient 4. As with techniques for determining PTT in which processing circuitry of IMD 10 receives a subcutaneous tissue impedance signal from a plurality of electrodes 16A-16D, techniques for determining PTT that include using an optical sensor include identifying one or more features within a cardiac cycle of patient 4, and associating a first time T1 with an occurrence in the cardiac cycle. Instead of determining a second time T2 based on an impedance signal, however, IMD 10 may determine T2 by identifying a fluctuation in the intensity and/or wavelength of light detected by one or both of light detectors 40A, 40B occurring after T1, and associate the second time (T2) with the fluctuation, which may represent the passing of blood ejected during the cardiac cycle through the portion of the vasculature near the light detectors 40A, 40B. By subtracting T2 from T1, processing circuitry of IMD 10 then may determine a PTT value (e.g., in milliseconds) of patient 4.

In some examples, IMD 10 may include one or more additional sensors, such as one or more accelerometers (not shown). Such accelerometers may be 3D accelerometers configured to generate signals indicative of one or more types of movement of the patient, such as gross body movement (e.g., activity) of the patient, patient posture, movements associated with the beating of the heart, or coughing, rales, or other respiration abnormalities. In some examples, one or more of such accelerometers may be used, in conjunction with light emitter 38 and optical detectors 40A, 40B, to determine a ballistocardiogram (i.e., a measure of motion corresponding to blood ejection at systole) that processing circuitry of IMD 10 may use to determine PTT instead of or in addition to an ECG signal from a pair of electrodes 16A-16D. Additionally, or alternatively, one or more of the parameters monitored by IMD 10 (i.e., Z, $StO_2$, or PTT) may fluctuate in response to changes in one or more such types of movement. For example, changes in Z, $StO_2$, or PTT values sometimes may be attributable to increased patient activity (e.g., exercise or other physical activity as compared to inactivity) or to changes in patient posture, and not necessarily to changes in a heart failure status caused by a progression of a heart failure condition. Thus, in some methods of determining a heart failure status of patient 4, it may be advantageous to account for such fluctuations when determining whether a change in a parameter, such as Z, $StO_2$, or PTT, that exceeds a threshold is indicative of a change in a corresponding one of a congestion status, a tissue perfusion status, or a blood pressure status of patient 4.

In such examples, processing circuitry of IMD 10 may receive one or more signals from one or more accelerometers of IMD 10, and determine a value of one or more patient-activity parameters, such as gross body movement. In this example, processing circuitry of IMD 10 may cross-reference the determined patient-activity value with values of one or more other parameters, such as a Z, $StO_2$, or PTT value. If the patient-activity value satisfies a threshold, processing circuitry of IMD 10 may determine that a change in a current a Z, $StO_2$, or PTT value that otherwise may indicate a change in a heart failure status does not indicate a change in a congestion, tissue perfusion, or blood pressure status of patient 4. In such instances, processing circuitry of patient 4 may designate the current value as an outlier and not use it in determining a heart failure status of patient 4. In some examples, processing circuitry of IMD 10 may cross-reference the determined activity or posture values with different scaling factors to be applied the Z, $StO_2$, or PTT values prior to comparison to a threshold, or to different threshold values to which to compare the measured Z, $StO_2$, or PTT values. Although processing circuitry of IMD 10 is described above as being configured to receive signals from one or more accelerometers, electrodes 16A-16D, light emitter 38, and/or light detectors 40A, 40B of IMD 10 and determine a value of one or more parameters of patient 4 based on such signals, any steps described herein as being carried out by processing circuitry of IMD 10 may carried out by processing circuitry of one or more devices. For example, processing circuitry of external device 12, or any other suitable implantable or external device or server, may be configured to receive signals from the one or more accelerometers, electrodes 16A-16D, light emitter 38, and/or light detectors 40A, 40B of IMD 10, such as via communication circuitry of IMD 10.

FIG. 3 is a functional block diagram illustrating an example configuration of IMD 10 of FIGS. 1 and 2. In the illustrated example, IMD 10 includes processing circuitry 50 sensing circuitry 52, communication circuitry 54, memory 56, switching circuitry 58, sensors 62, timing/control circuitry 64, in addition to previously-described electrodes 16A-16D, one or more of which may be disposed within housing 14 of IMD 10, and light emitter 38. In some examples, memory 56 includes computer-readable instructions that, when executed by processing circuitry 50, cause IMD 10 and processing circuitry 50 to perform various functions attributed to IMD 10 and processing circuitry 50 herein. Memory 56 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Processing circuitry 50 may include fixed function circuitry and/or programmable processing circuitry. Processing circuitry 50 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 50 may include multiple components, such as any combination of one or more microprocessors, one or more controllers, one or more DSPs, one or more ASICs, or one or more FPGAs, as well as other discrete or integrated logic circuitry. The functions attributed to processing circuitry 50 herein may be embodied as software, firmware, hardware or any combination thereof.

Timing and control circuitry 64 may be embodied as hardware, firmware, software, or any combination thereof. In some examples, timing and control circuitry 64 may comprise a dedicated hardware circuit, such as an ASIC, separate from other processing circuitry 50 components, such as a microprocessor, or a software module executed by a component of processing circuitry 50 (e.g., a microprocessor or ASIC). Timing and control circuitry 64 may monitor the passage of time to determine when a monitoring period has elapsed, and help control IMD 10 to measure current values of Z, $StO_2$, and PTT of patient 4. Timing and control circuitry 64 also may control IMD 10 to transmit a heart failure status of patient 4 to external device 12, at the conclusion of a corresponding interval.

In some examples, timing and control circuitry 64 may be configured to associate current values of Z, $StO_2$, and PTT with a particular time of day, such as day time or night time, so as to enable processing circuitry 50 to take into account a circadian rhythm of patient 4 when determining congestion, tissue perfusion, and/or blood pressure statuses of patient 4. For example, one or more of the values of Z, $StO_2$, and PTT values of patient 4 generally may decrease when patient 4 is asleep (e.g., nighttime), and increase when patient 4 is awake (e.g., daytime). Thus, IMD 10 may be configured to use different (e.g., lower) baseline value and/or threshold values for a particular parameter at times when patient 4 is likely to be asleep than when patient 4 is likely to be awake. In some examples in which IMD 10 includes one or more accelerometers, processing circuitry 50 may cross-reference a time of day indicated by timing and control circuitry with accelerometer data, such as to confirm whether patient 4 is asleep or awake as predicted based on the time of day. In this manner, timing and control circuitry 64 may enhance the ability of IMD 10 to accurately determine a heart failure status of patient 4.

In addition to sensed physiological parameters of patient 4 (e.g., determined values of Z, $StO_2$, and PTT), one or more time intervals for timing the measurements of Z, $StO_2$, and PTT by processing circuitry 50 may be stored by memory 56 in stored measurements/intervals 68. For example, the intervals 68 stored by memory 56 may instruct processing circuitry 50 to measure current values of Z, $StO_2$, and PTT of patient 4 hourly, several times daily, daily, or at any other appropriate interval. Stored measurements/intervals 68 also may include intervals at which processing circuitry may be configured to transmit a heart failure status of patient 4 to external device 12, such as daily, weekly, or at any other suitable interval. In some examples, processing circuitry 50 may select intervals for measuring Z, $StO_2$, and PTT or for transmitting a heart failure status of patient 4 from stored measurements/intervals 68. In other examples, a clinician may select interval values depending upon the needs of patient 4, such as by using an application on a tablet or other smart device, which in some examples may be external device 12.

As illustrated in FIG. 3, memory 56 also may include one or more tables 70 for storing baseline, threshold, and evidence level values. As described above, in some examples, processing circuitry 50 of IMD 10 may be configured to determine baseline values of Z, $StO_2$, and PTT during a learning phase of IMD 10, which then may be stored in tables 70. In addition, tables 70 may include pre-programmed baseline values that a clinician may select for patient 4 during setup of IMD 10, or baseline values that a clinician may manually enter based on the clinician's assessments of patient 4. Processing circuitry 50 also may be configured to determine threshold values for deviations of current values of Z, $StO_2$, and PTT from the baseline values, and store the threshold values in tables 70. In some examples, processing circuitry 50 may determine such threshold values based, at least in part, on baseline values selected for patient 4. In addition to the baseline values, tables 70 may include threshold values that a clinician may select for patient 4 during setup of IMD 10, or threshold values that a clinician may manually enter based on the clinician's assessments of patient 4. Tables 70 also may include values for evidence levels that may be associated with certain values of Z, $StO_2$, or PTT that may be used by processing circuitry 50 to determine a diagnostic score of patient 4. As described above, a heart failure status may comprise a diagnostic score of patient 4, which in some examples may be a composite diagnostic score based on a combination of values of evidence levels associated with one or more current values of Z, $StO_2$, and PTT of patient 4.

Sensing circuitry 52 and communication circuitry 54 may be selectively coupled to electrodes 16A-16D via switching circuitry 58, as controlled by processing circuitry 50. Sensing circuitry 52 may monitor signals from electrodes 16A-16D in order to monitor electrical activity of heart (e.g., to produce an ECG for PTT determination), and/or subcutaneous tissue impedance Z (e.g., as a measure of congestion or for PTT determination). Sensing circuitry 52 also may monitor signals from sensors 62, which may include light detectors 40A, 40B, and any additional light detectors that may be positioned on iMB 10. In some examples, sensing circuitry 52 may include one or more filters and amplifiers for filtering and amplifying signals received from one or more of electrodes 16A-16D and/or light detectors 40A, 40B.

In some examples, processing circuitry 50 also may include a rectifier, filter and/or amplifier, a sense amplifier, comparator, and/or analog-to-digital converter. Upon receiving signals from electrodes 16A-16D and light detectors 40A, 40B via sensing circuitry 52, processing circuitry 50 may determine current values for each of Z, $StO_2$, and PTT for patient 4. Processing circuitry then may compare the current values of Z, $StO_2$, and PTT to the baseline levels stored in tables 70, and determine whether differences between the current values and the corresponding baseline levels satisfy corresponding thresholds stored in tables 70.

The threshold values stored in tables 70 may be associated with changes in certain parameters of a heart failure status of patient 4. For example, a threshold value corresponding to the Z value may be associated with a change in a congestion status of patient 4, whereas a threshold value corresponding to the $StO_2$ value may be associated with a change in a tissue perfusion status of patient 4, and a threshold value corresponding to the PTT value may be associated with a change in a vascular resistance or blood pressure status of patient 4. In some examples, processing circuitry 50 may identify evidence level values associated with the current values of Z, $StO_2$, and PTT of patient 4, and determine a diagnostic score associated with a combination of the evidence levels. Processing circuitry 50 may store the determined current values, associated evidence levels, and diagnostic scores in stored measurements/intervals 68 of memory 56, along with an indication of a date and time of the measurements. Simultaneously or thereafter, processing circuitry 50 may transmit, via communication circuitry 54, the diagnostic score and/or one or more additional indicators of a heart failure status of patient 4 to external device 12.

Communication circuitry 54 may include any suitable hardware, firmware, software or any combination thereof for communicating with another device, such as external device 12 or another IMD or sensor, such as a pressure sensing device. Under the control of processing circuitry 50, communication circuitry 54 may receive downlink telemetry from, as well as send uplink telemetry to, external device 12 or another device with the aid of an internal or external antenna, e.g., antenna 26. In some examples, communication circuitry 54 may communicate with external device 12. In addition, processing circuitry 50 may communicate with a networked computing device via external device (e.g., external device 12) and a computer network, such as the Medtronic CareLink® Network developed by Medtronic, plc, of Dublin, Ireland.

A clinician or other user may retrieve data from IMD 10 using external device 12, or by using another local or networked computing device configured to communicate with processing circuitry 50 via communication circuitry 54. The clinician may also program parameters of IMD 10 using external device 12 or another local or networked computing device. In some examples, the clinician may select baseline values, threshold values, times of day for Z, $StO_2$, and PTT measurements, or a number of measurements to be completed during a period, e.g., day, and may program evidence levels to be associated with the parameters of Z, $StO_2$, and PTT.

The various components of IMD 10 may be coupled a power source, which may include a rechargeable or non-rechargeable battery positioned within housing 14 of IMD 10. A non-rechargeable battery may be selected to last for several years, while a rechargeable battery may be inductively charged from an external device, e.g., on a daily or weekly basis.

FIGS. 4A and 4B illustrate two additional example IMDs that may be substantially similar to IMD 10 of FIGS. 1-3, but which may include one or more additional features. The components of FIGS. 4A and 4B may not necessarily be drawn to scale, but instead may be enlarged to show detail. FIG. 4A is a block diagram of a top view of an example configuration of an IMD 10A. FIG. 4B is a block diagram of a side view of example IMD 10B, which may include an insulative layer as described below.

FIG. 4A is a conceptual drawing illustrating another example IMD 10A that may be substantially similar to IMD 10 of FIG. 1. In addition to the components illustrated in FIGS. 1-3, the example of IMD 10 illustrated in FIG. 4A also may include a body portion 72 and an attachment plate 74. Attachment plate 74 may be configured to mechanically couple header 32 to body portion 72 of IMD 10A. Body portion 72 of IMD 10A may be configured to house one or more of the internal components of IMD 10 illustrated in FIG. 3, such as one or more of processing circuitry 50, sensing circuitry 52, communication circuitry 54, memory 56, switching circuitry 58, internal components of sensors 62, and timing control circuitry 64. In some examples, body portion 72 may be formed of one or more of titanium, ceramic, or any other suitable biocompatible materials.

FIG. 4B is a conceptual drawing illustrating another example IMD 10B that may include components substantially similar to IMD 10 of FIG. 1. In addition to the components illustrated in FIGS. 1-3, the example of IMD 10B illustrated in FIG. 4B also may include a wafer-scale insulative cover 76, which may help insulate electrical signals passing between electrodes 16A-16D and/or optical detectors 40A, 40B on housing 14B and processing circuitry 50. In some examples, insulative cover 76 may be positioned over an open housing 14 to form the housing for the components of IMD 10B. One or more components of IMD 10B (e.g., antenna 26, light emitter 38, light detectors 40A, 40B, processing circuitry 50, sensing circuitry 52, communication circuitry 54, switching circuitry 58, and/or timing/ control circuitry 64) may be formed on a bottom side of insulative cover 76, such as by using flip-chip technology. Insulative cover 76 may be flipped onto a housing 14B. When flipped and placed onto housing 14B, the components of IMD 10B formed on the bottom side of insulative cover 76 may be positioned in a gap 78 defined by housing 14B.

Insulative cover 76 may be configured so as not to interfere with the operation of IMD 10B. For example, one or more of electrodes 16A-16D may be formed or placed above or on top of insulative cover 76, and electrically connected to switching circuitry 58 through one or more vias (not shown) formed through insulative cover 76. In addition, to enable IMD to determine values of $StO_2$ and PTT, at least a portion of insulative cover 76 may transparent to the NIR or visible wavelengths emitted by light emitter 38 and detected by light detectors 40A, 40B, which in some examples may be positioned on a bottom side of insulative cover 76 as described above.

In some examples, light emitter 38 may include an optical filter between light emitter 38 and insulative cover 76, which may limit the spectrum of emitted light to be within a narrow band. Similarly, light detectors 40A, 40B may include optical filters between light detectors 40A, 40B and insulative cover 76, so that light detectors 40A, 40B detects light from a narrow spectrum, generally at longer wavelengths than the emitted spectrum. Other optical elements that may be included in the IMD 10B may include index matching layers, antireflective coatings, or optical barriers, which may be configured to block light emitted sideways by the light emitter 38 from reaching light detector 40.

Insulative cover 76 may be formed of sapphire (i.e., corundum), glass, parylene, and/or any other suitable insulating material. Sapphire may be greater than 80% transmissive for wavelengths in the range of about 300 nm to about 4000 nm, and may have a relatively flat profile. In the case of variation, different transmissions at different wavelengths may be compensated for, such as by using a ratiometric approach. In some examples, insulative cover 76 may have a thickness of about 300 micrometers to about 600 micrometers. Housing 14B may be formed from titanium or any other suitable material (e.g., a biocompatible material), and may have a thickness of about 200 micrometers to about 500 micrometers. These materials and dimensions are examples only, and other materials and other thicknesses are possible for devices of this disclosure.

Figure 5:
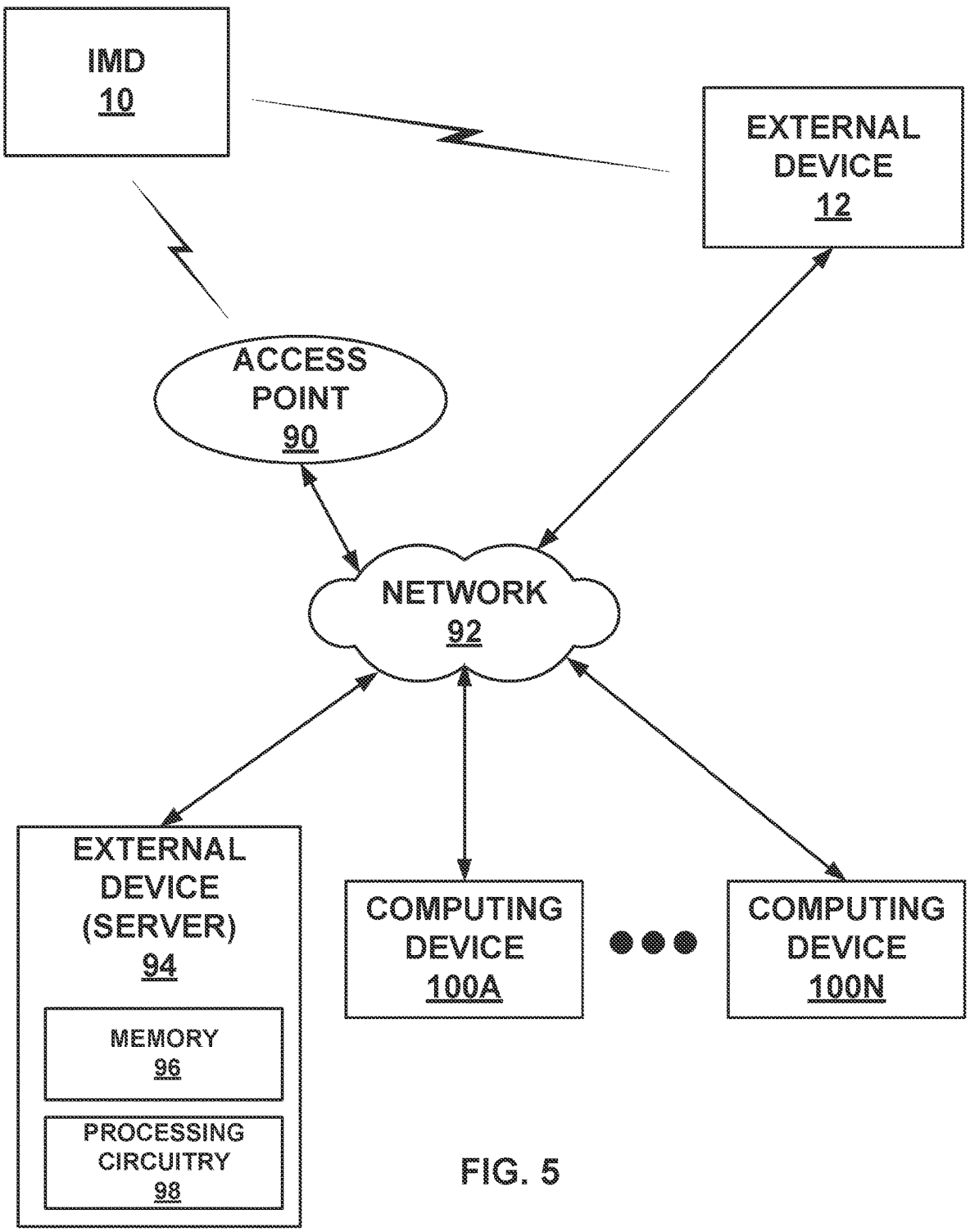
FIG. 5 is a block diagram illustrating an example system that includes an external device, such as a server, and one or more computing devices that are coupled to the leadless implantable medical device of FIG. 1 and the external device of FIG. 1 via a network.

FIG. 5 is a functional block diagram illustrating an example system that includes an access point 90, a network 92, external computing devices, such as a server 94, and one or more other computing devices 100A-100N, which may be coupled to IMD 10, sensing device 12, and external device 12 via network 92. In this example, IMD 10 may use communication module 54 to communicate with external device 12 via a first wireless connection, and to communication with an access point 90 via a second wireless connection. In the example of FIG. 5, access point 90, external device 12, server 94, and computing devices 100A-100N are interconnected and may communicate with each other through network 92.

Access point 90 may comprise a device that connects to network 92 via any of a variety of connections, such as telephone dial-up, digital subscriber line (DSL), or cable modem connections. In other examples, access point 90 may be coupled to network 92 through different forms of connections, including wired or wireless connections. In some examples, access point 90 may be a user device, such as a tablet or smartphone, that may be co-located with the patient. As discussed above, IMD 10 may be configured to transmit data, such as current values and heart failure statuses, to external device 12. In addition, access point 90 may interrogate IMD 10, such as periodically or in response to a command from the patient or network 92, in order to retrieve current values or heart failure statuses determined by processing circuitry 50 of IMD 10, or other operational or patient data from IMD 10. Access point 90 may then communicate the retrieved data to server 94 via network 92.

In some cases, server 94 may be configured to provide a secure storage site for data that has been collected from IMD 10, and/or external device 12. In some cases, server 94 may assemble data in web pages or other documents for viewing by trained professionals, such as clinicians, via computing devices 100A-100N. One or more aspects of the illustrated system of FIG. 5 may be implemented with general network technology and functionality, which may be similar to that provided by the Medtronic CareLink® Network developed by Medtronic plc, of Dublin, Ireland.

In some examples, one or more of computing devices 100A-100N (e.g., device 100A) may be a tablet or other smart device located with a clinician, by which the clinician may program, receive alerts from, and/or interrogate IMD 10. For example, the clinician may access patient 4's Z, $StO_2$, and PTT measurements through device 100A, such as when patient 4 is in in between clinician visits, to check on a heart failure status of patient 4 as desired. In some examples, the clinician may enter instructions for a medical intervention for patient 4 into an app in device 100A, such as based on a heart failure status of patient 4 determined by IMD 10, or based on other patient data known to the clinician. Device 100A then may transmit the instructions for medical intervention to another of computing devices 100A-100N (e.g., device 100B) located with patient 4 or a caregiver of patient 4. For example, such instructions for medical intervention may include an instruction to change a drug dosage, timing, or selection, to schedule a visit with the clinician, or to seek medical attention. In further examples, device 100B may generate an alert to patient 4 based on a heart failure status of patient 4 determined by IMD 10, which may enable patient 4 proactively to seek medical attention prior to receiving instructions for a medical intervention. In this manner, patient 4 may be empowered to take action, as needed, to address his or her heart failure status, which may help improve clinical outcomes for patient 4.

FIGS. 6-12 are flow diagrams illustrating various techniques related to determining a heart failure status of a patient based on a comparison of current Z, $StO_2$, and PTT values of the patient to corresponding baseline values, in accordance with examples of this disclosure. As described herein, the techniques illustrated FIGS. 6-12 may be employed using one or more components of system 2, which have been described above with respect to FIGS. 1-5. Although described as being performed by IMD 10, the techniques of FIGS. 6-12 may be performed, in whole or in part, by processing circuitry and memory of other devices of a medical device system, as described herein. For example, although processing circuitry 50 of IMD is described as carrying out most of the example techniques illustrated in FIGS. 6-9 for the sake of clarity, in other examples, one or more devices (e.g., external device 12 or other external device or server) or a clinician may carry out one or more steps attributed below to processing circuitry 50 of IMD 10.

Figure 6:
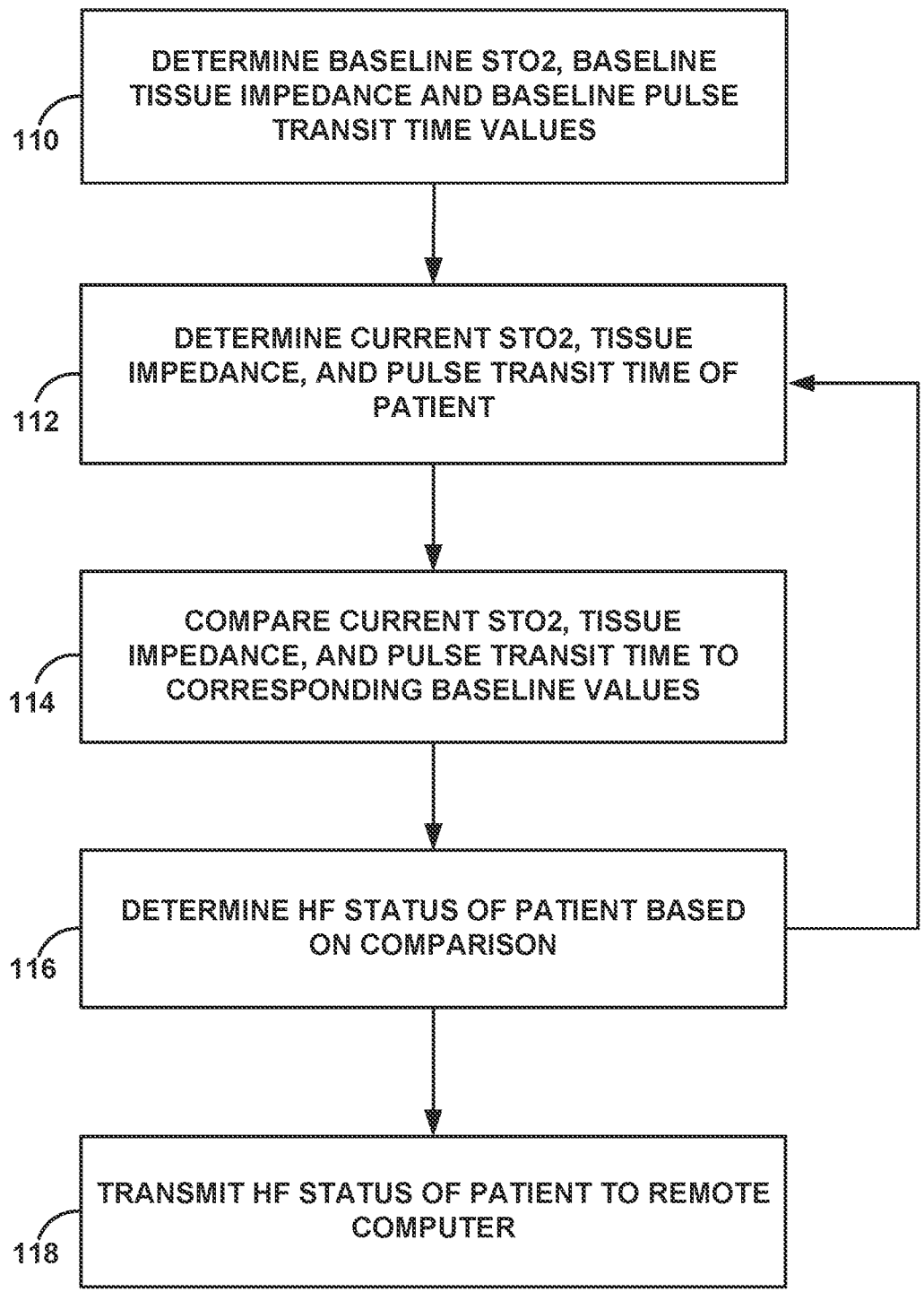
FIG. 6 is a flow diagram illustrating an example technique for determining a heart failure status of a patient based on a comparison of current tissue oxygen saturation, impedance, and pulse transit time values to corresponding baseline values, and transmitting the heart failure status to a remote computer.

FIG. 6 is a flow diagram illustrating an example technique for determining, by processing circuitry 50 of IMD 10, a heart failure status of patient 4 based on a comparison of current tissue oxygen saturation, impedance, and pulse transit time values (i.e., Z, $StO_2$, and PTT) of patient 4 to corresponding baseline values stored in tables 70 of memory 56, and transmitting the heart failure status to remote device 12. According to the example of FIG. 6, IMD 10 may determine baseline Z, $StO_2$, and PTT values for patient 4 (110). In some examples, IMD 10 may determine the baseline values during a learning phase of IMD 10 following implantation of IMD 10 into patient 4, as discussed above with respect to FIG. 1. Such a learning phase may take place after implantation of IMD 10 at a time that a heart failure condition of patient 4 is stable (e.g., compensated).

During the learning phase, IMD 10 periodically may determine current values of Z, $StO_2$, and PTT of patient 4 based on signals received from one or more of electrodes 16A-16D, light emitter 38, and light detectors 40A, 40B and store the values in stored measurements/intervals 68. IMD 10 then may analyze the collected values of Z, $StO_2$, and PTT to determine the baseline values for patient 4. In some examples, IMD 10 may reject any outlier values of Z, $StO_2$, and PTT, and average the remaining measurements, although other methods of data analysis may be used to determine the baseline values from the collected values. In other examples, a clinician may determine baseline values for patient 4 by selecting baseline values stored in tables 70 of IMD 10 may as part of a start-up phase of treatment following the implantation of IMD 10 within patient 4. In some examples, IMD 10 also may determine threshold values for each of the baseline Z, $StO_2$, and PTT values for patient 4. For example, processing circuitry 50 may determine the threshold values for patient 4 based on the determined baseline values for patient 4 by selecting the threshold values from tables 70. In other examples, a clinician may select threshold values for patient 4, which IMD then may associate with the baseline values of Z, $StO_2$, and PTT for patient 4 in tables 70.

After IMD 10 has determined baseline and/or threshold values of Z, $StO_2$, and PTT for patient 4, such as at the conclusion of a learning phase of IMD 10, IMD 10 may begin determining current values of Z, $StO_2$, and PTT for patient 4 (112). For example, processing circuitry 50 of IMD 10 may receive signals from one or more of electrodes 16A-16D, light emitter 38, and light detectors 40A, 40B, and determine current values of Z, $StO_2$, and PTT based on these signals, as described above with respect to FIGS. 1-3. Next, processing circuitry 50 of IMD 10 may compare the current Z, $StO_2$, and PTT values of patient 4 to corresponding baseline values of patient 4 stored in tables 70, and determine a difference between each of the current values of Z, $StO_2$, and PTT and the corresponding baseline values (114). In some examples, processing circuitry 50 also may determine whether a difference between one or more of the current values and the corresponding baseline values satisfies a threshold value.

Based on the differences between the current values and the baseline values determined at (114) and/or the determination of whether one or more of the differences satisfy a threshold value, processing circuitry 50 then determines a heart failure status of patient 4 (116). As described herein, determining a heart failure status may comprise determining a change in heart failure status of the patient, e.g., whether a change in status is sufficient to indicate acute decompensation.

In some examples, a threshold change value for a given parameter may be an absolute value of a percentage of the baseline value. For example, if a baseline value of Z=X, then a threshold value of Z may be X±0.2X. In other examples, one or more of Z, $StO_2$, and PTT may be associated with multiple threshold values that correspond to different percentages of the baseline values, which may take into account differences in significance between values that exceed a baseline value and values that are less than a baseline value. For example, if a baseline value of Z=X, then threshold values of Z may be X+0.2X and X−0.1X, where values of Z that are less than X have relatively greater significance than values of Z that are greater than X. In any such examples, the threshold values may be based on deviations from corresponding baseline values, such as standard deviations or any other suitable statistical functions.

IMD 10 may repeat steps 112-116 to periodically determine updated heart failure statuses of patient 4 such as daily, weekly, monthly, or at any other suitable period. In some examples, the heart failure status of patient 4 may comprise a diagnostic score that indicates a likelihood that patient 4 may require hospitalization within a certain period of time, based on changes in the congestion, perfusion, and vascular/blood pressure statuses of patient 4. For example, processing circuitry 50 may determine a diagnostic score of patient 4 based on a combination of values of one or more evidence levels associated with the current values of Z, $StO_2$, and PTT. In general, evidence levels associated with greater severities of congestion (as indicated by a relatively low Z), inadequate peripheral perfusion (as indicated by a relatively low $StO_2$), and vasoconstriction (as indicated by a relatively low PTT) may have higher values than evidence levels associated with lesser severities of such parameters of heart failure. Thus, a higher diagnostic score may indicate that patient 4 is at a greater risk of acute decompensation and/or hospitalization or other adverse medical events within a certain time period than a lower diagnostic score. The determination by processing circuitry 50 of a heart failure status of patient 4 based on diagnostic scores is described further with respect to FIG. 8 below. Regardless of whether the heart failure status of patient 4 determined by processing circuitry 50 comprises a diagnostic score, processing circuitry then transmits the heart failure status of patient 4 to a remote computer, such as external device 12 (118).

Figure 7:
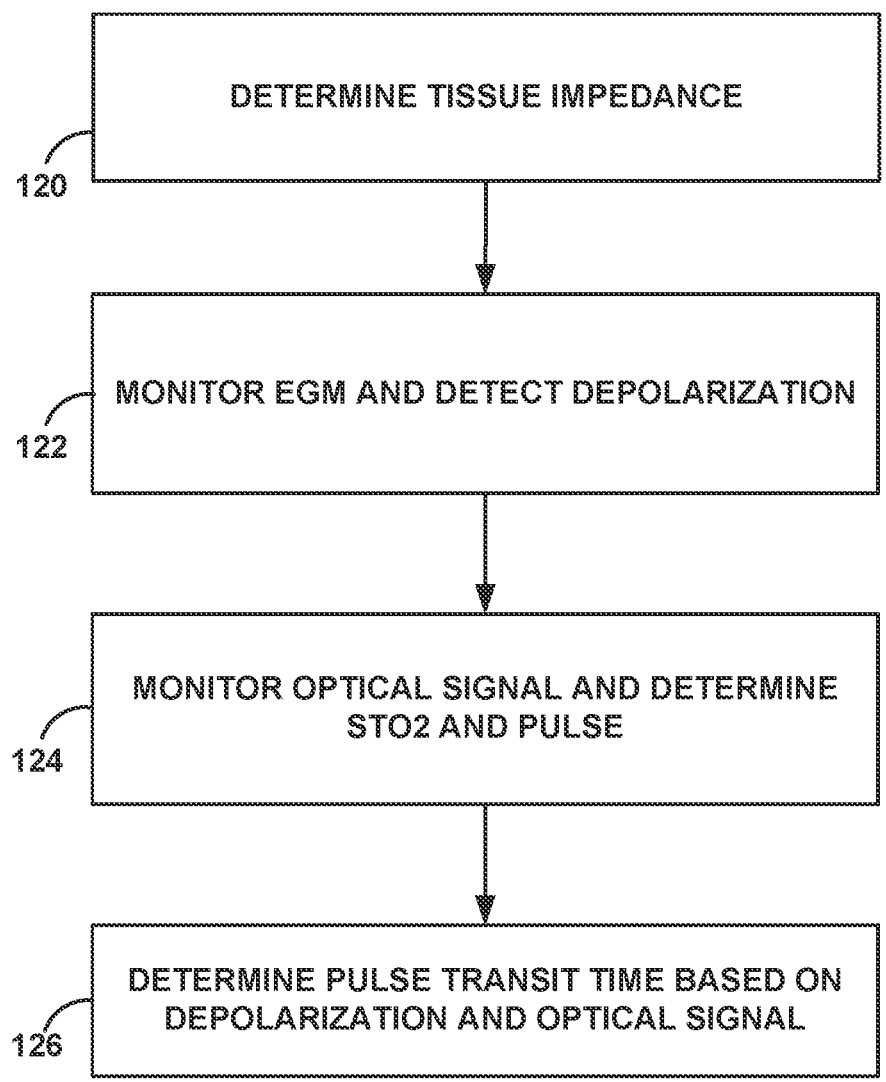
FIG. 7 is a flow diagram illustrating an example technique for determining the baseline or current values of tissue impedance, tissue oxygen saturation, and pulse transit time of FIG. 6.

FIG. 7 is a flow diagram illustrating an example technique for determining the baseline or current values of tissue impedance, tissue oxygen saturation, and pulse transit time described with respect to FIG. 6. For example, processing circuitry 50 of IMD 10 may generate one of a current or voltage signal, deliver the signal via a selected two or more of electrodes 16A-16D, and measure the resulting other of current or voltage. Processing circuitry 50 then may determine an impedance signal based on the delivered current or voltage and the measured voltage or current. Based on the signal, processing circuitry 50 determines an impedance value of subcutaneous tissue of patient 4 in the region of implanted IMD 10 (120). The subcutaneous tissue impedance value may be used as current value Z of patient 4, which is a measure of a congestion status of patient 4 and pertains to a heart failure status of patient 4. For example, a relatively low value of Z may indicate a relatively high amount of blood and/or other fluid in the subcutaneous tissue near IMD 10. Thus, if the current value of Z is relatively low and/or is lower than a previous measured value of Z, patient 4 may be experiencing an increase in congestion, which may be reflected in a diagnostic score determined by processing circuitry 50.

To determine a current value of PTT for patient 4, processing circuitry 50 receives cardiac EGM signals (e.g., ECG signals) from at least two of electrodes 16A-16D, and detects a depolarization, such as a beginning of an R wave, within the depolarization (122). In some examples, at least one of the electrodes 16A-16D that transmit cardiac EGM signals to processing circuitry 50 may be an electrode used to transmit a signal indicative of a subcutaneous tissue impedance value to processing circuitry 50, although in other examples, there may not be such overlap in electrode usage. Processing circuitry 50 determines a current $StO_2$ value based on signals received by processing circuitry 50 from light detectors 40A, 40B. In order to generate such signals, processing circuitry 50 may control light emitter 38 to emit light at one or more wavelengths in the NIR and/or visible spectra into the subcutaneous tissue adjacent IMD 10. A portion of the emitted light is absorbed by the tissue of patient 4, and a portion of the emitted light is reflected by the tissue and received by light detectors 40A, 40B. Light detectors 40A, 40B then generate electrical signals indicating the intensities of the received light, which processing circuitry 50 evaluates in order to determine a current $StO_2$ value of patient 4 (124). Processing circuitry 50 additionally receives signals from light detectors 40A, 40B, which may comprise electrical signals indicative of intensities of light detected by light detectors 40A, 40B, and monitors the signals for fluctuations corresponding to a pulse of blood ejected during the observed cardiac cycle passing through the portion of the vasculature near light detectors 40A, 40B. As discussed above with respect to FIG. 2, processing circuitry 50 may determine an amount of time between the detection of the cardiac cycle by processing circuitry 50 and the time of associated blood passing light detectors 40A, 40B (124), and identify the amount of time as a current PTT value of patient 4 (126). In other examples, such as those discussed above with respect to FIG. 2, processing circuitry 50 may determine a current PTT value of patient 4 based on an ECG and fluctuations in subcutaneous tissue impedance detected by two or more of electrodes 16A-16D, instead of based on an ECG and signals from optical detectors 40A, 40B.

In some examples, the current values of one or more of Z, $StO_2$, and PTT may exhibit random variability. In order to account for such variability, a comparison of the current diagnostic score to the baseline diagnostic score carried out by processing circuitry 50 may include curve fitting and trend analysis. For example, if processing circuitry 50 measures values of Z, $StO_2$, and PTT several times daily, processing circuitry may accumulate such values over a period of time (e.g., over several days or several weeks) and fit the accumulated values of each of Z, $StO_2$, and PTT to a corresponding trendline. Then, processing circuitry 50 may use the trendlines to project corresponding current values of Z, $StO_2$, and PTT. In this manner, processing circuitry 50 may account for random fluctuations when determining current values of Z, $StO_2$, and PTT as described above, which may enhance the accuracy with which the current values of Z, $StO_2$, and PTT reflect the congestion, tissue perfusion, and blood pressure statuses of patient 4.

Figure 8:
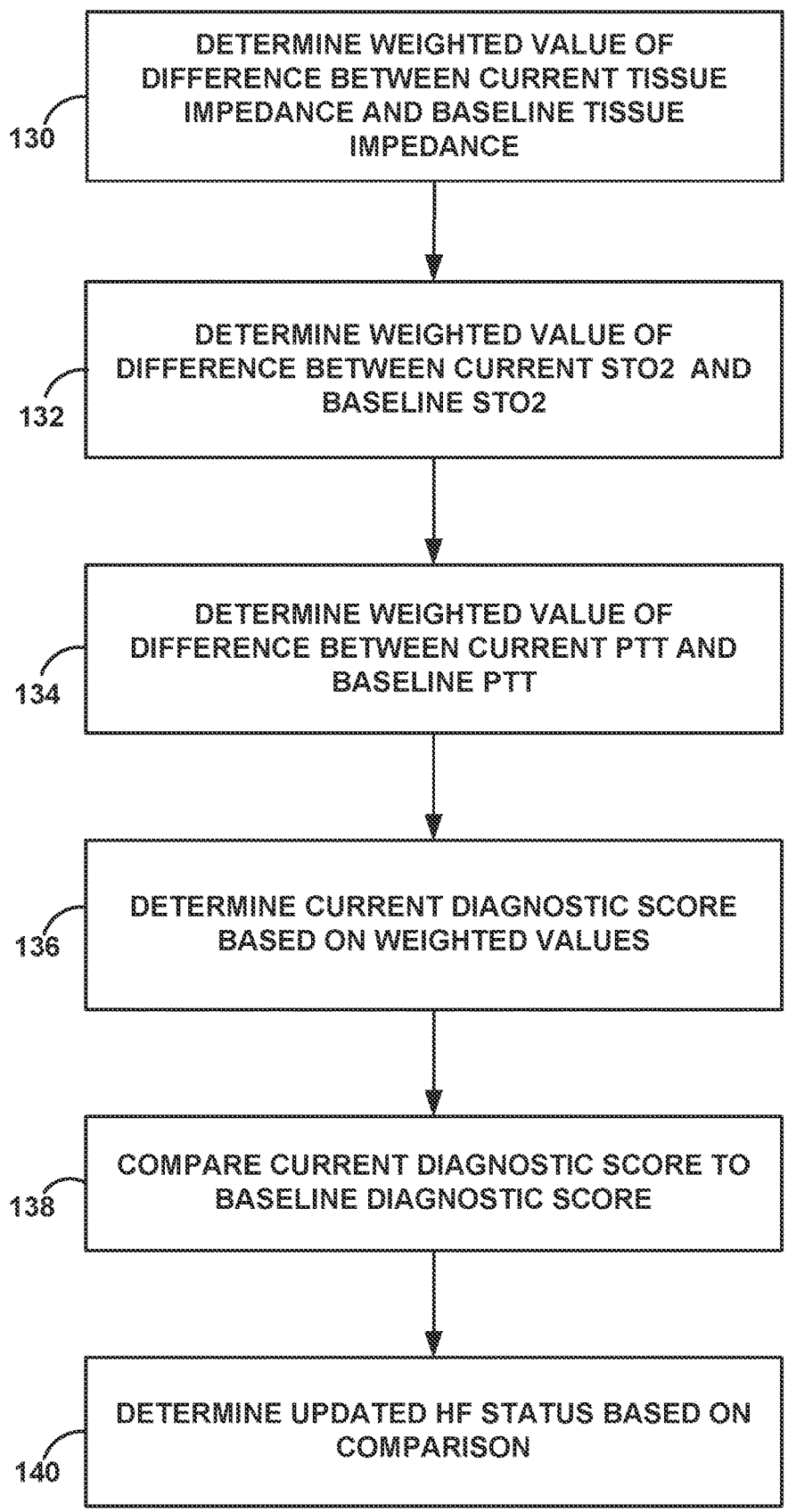
FIG. 8 is a flow diagram illustrating an example technique for determining a current diagnostic score and determining an updated heart failure status of a patient based on a comparison of the current diagnostic score to a baseline diagnostic score.

FIG. 8 is a flow diagram illustrating an example technique for determining, by processing circuitry 50 of IMD 10, a current diagnostic score of patient 4, and determining an updated heart failure status of patient 4 based on a comparison of the current diagnostic score to a baseline diagnostic score. A comparison of a current diagnostic score of patient 4 to a baseline diagnostic score of patient 4 may provide additional information about changes in a heart failure status of patient 4, and may further inform monitoring and treatment decisions and improve clinical outcomes. In some examples, a current diagnostic score may be determined based on weighted values of the differences between current values (Z, $StO_2$, and PTT) of patient 4 and the corresponding baseline values. For example, processing circuitry 50 may determine a difference between current values of each of Z, $StO_2$, and PTT and the corresponding baseline values of patient 4, as described with respect to FIG. 6. Then, processing circuitry 50 may determine a weighted value for each of the differences between the current values and the corresponding baseline values. Specifically, processing circuitry 50 determines a weighted value of a difference between the current Z and the baseline Z of patient 4 (130), a weighted value of a difference between the current $StO_2$ and the baseline $StO_2$ of patient 4 (132), and a weighted value of a difference between the current PTT and the baseline PTT of patient 4 (134).

In some examples, the weights assigned by processing circuitry 50 to the difference values may be based on factors such as a medical history of patient 4. As discussed above with respect to FIG. 1, processing circuitry 50 of IMD 10 may assign such weights based on events in the medical history of patient 4, such as hospital admissions for heart failure, medication changes, history of systolic heart failure, hypertension, respiratory illness (e.g., COPD), diabetes, atrial fibrillation, renal failure, one or more blood disorders (e.g., anemia), one or more sleep disorders (e.g., sleep apnea), among others. For example, patient 4 may have a medical history of becoming congested, which may indicate that patient 4 is especially likely to become congested in the future. Or, population-based data may indicate that patients having a same or similar profile of baseline values as patient 4 may be particularly likely to become congested (or inadequately perfused or vasoconstricted). In such a situation, processing circuitry 50 may assign added weight to the difference between the current Z and the baseline Z, thereby rendering the diagnostic score of patient 4 more sensitive to fluctuations in Z values of patient 4. Similarly, weights assigned by processing circuitry to the difference values may have negative values, such as if a medical history of patient 4 or population-based data indicate that patient 4 is unlikely to become congested (or inadequately perfused or vasoconstricted). Processing circuitry 50 then may combine the weighted values of the differences between the current values and the baseline values, to determine a current diagnostic score for patient 4 (136), and then compare the current diagnostic score to a baseline diagnostic score (138). The baseline diagnostic score may be a diagnostic score previously determined by processing circuitry 50 based on values of one or more evidence levels associated with the baseline values of patient 4. For example, the baseline diagnostic score may represent a risk of hospitalization for patient 4 when patient 4 is compensated, such as when a heart failure status of patient 4 is stable. Processing circuitry 50 then may determine an updated heart failure status of patient 4 based on the comparison of the baseline diagnostic score to the current diagnostic score (140). As in the method of FIG. 6, processing circuitry 50 may transmit the updated heart failure status to a remote computer, such as external device 12. External device 12, or another remote computer, then may transmit instructions for a medical intervention (e.g., a change in a drug regimen, or instructions to schedule a clinician visit or seek medical attention), to an interface of a user device located with patient 4.

In some cases, this method of determining a heart failure status of patient 4 advantageously may provide context to a current diagnostic score determined for patient 4 by taking into consideration the extent to which the current diagnostic score deviates from a baseline diagnostic score. For example, a relatively greater difference between the baseline diagnostic score and the current diagnostic score may indicate a more significant worsening of patient 4's condition than a relatively smaller difference, even with the current diagnostic score held equal. In examples where a difference between the baseline and current diagnostic scores is relatively great (e.g., satisfies a threshold), external device 12 may transmit instructions for more aggressive medical interventions to a user device than examples in which the difference is smaller. In other examples, patient 4 may be added to a database of particularly at-risk patients, who may be monitored more closely by a clinician or by one or more of the devices described herein. In any such examples, treatment may be further tailored to the specific needs of patient 4 based on the magnitude of changes in patient 4's heart failure status over time.

Figure 9:
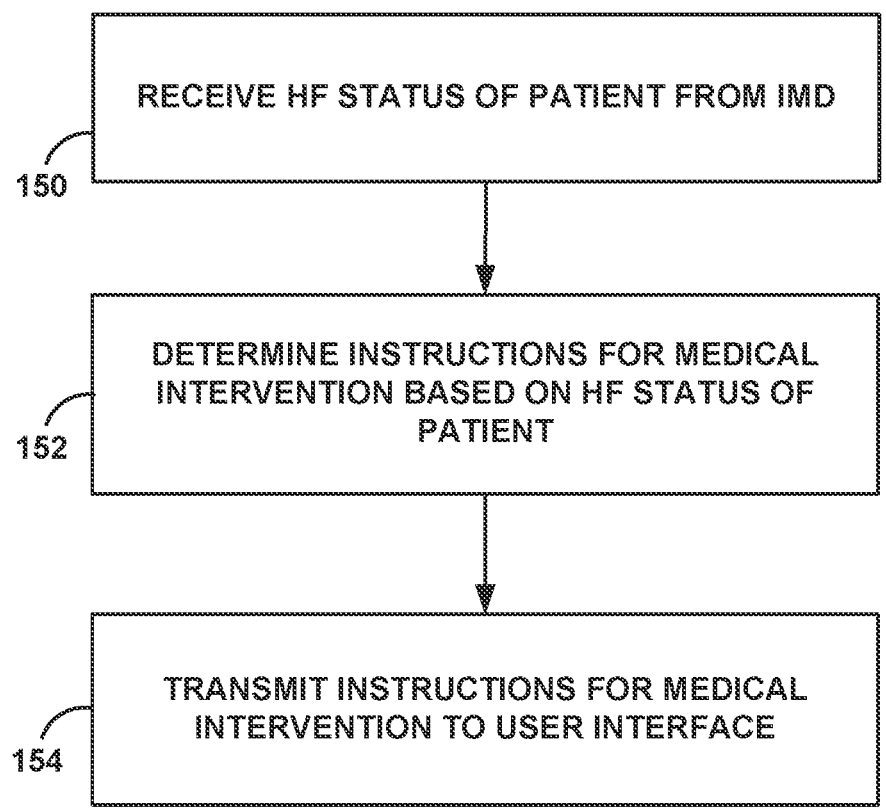
FIG. 9 is a flow diagram illustrating an example technique for a remote computer to determine instructions for a medical intervention based on a heart failure status received from the leadless implantable medical device of FIG. 1, and transmit the instructions to a user interface.

FIG. 9 is a flow diagram illustrating an example technique for external device 12 to determine instructions for a medical intervention based on a heart failure status of patient 4 received from IMD 10, and transmit the instructions to a user interface. The method illustrated in FIG. 9 may be used with any of the methods for determining a heart failure status by IMD 10 described herein, such as the methods illustrated in FIGS. 6 and 8. In the illustrated example, external device 12 is configured to receive a heart failure status of patient 4 from IMD 10, which may be transmitted to a processing circuitry of external device 12 via communication circuitry 54 and antenna 26 of IMD 10 (150).

In some examples, upon receiving the heart failure status of patient 4 from IMD 10 and prior to determining instructions for a medical intervention for patient 4, external device 12 may transmit one or more queries to a user device. For example, external device 12 may ask patient 4 or a caregiver to answer questions about recent or current activities or symptoms of patient 4, such as whether patient 4 recently has exercised, taken medications, or experienced symptoms. In addition, external device 12 may interrogate IMD 10 for current values of Z, $StO_2$, and PTT of patient 4, if IMD 10 did not already transmit the current values to external device 12. Based on the heart failure status of patient 4, and optionally based on answers to queries and/or the current values of patient 4, external device 12 then may determine instructions for a medical intervention for patient 4 (152).

External device 12 may determine instructions for multiple medical interventions for patient 4. For example, external device 12 may determine instructions for each of a congestion status, a peripheral perfusion status, and a vascular/blood pressure status of patient 4. For example, based on a congestion status of patient 4, external device 12 may determine instructions for modifying (e.g., start, stop, increase, or decrease) a dose of a diuretic drug, taking another type of diuretic drug, and/or modifying a dose of a venodilator drug (e.g., nitrates). Based on a peripheral perfusion status of patient 4, external device 12 may determine instructions for modifying dosages of one or more of a beta-blocker, ivabradine, or inotrope, or may recommend starting CRT or changing CRT parameters. Based on a vascular/blood pressure status of patient 4, external device 12 may determine instructions for modifying dosages of one or more of a vasoconstrictor agent (e.g., alpha-agonist) or a vasodilator agent (e.g., alpha-blocker), or may recommend seeking medical treatment if shock is likely. In some examples, instructions for medical interventions for patient 4 may take into account the presence of cardiac arrhythmia, as indicated by ECG signals of patient 4 detected by IMD 10. For example, instructions determined by external device 12 in the presence of arrhythmia may include instructions for patient 4 to avoid taking certain medications, instruct patient 4 to visit a healthcare facility, or may recommend starting CRT or changing CRT parameters. Further, in some examples, processing circuitry of IMD 10 may disregard changes in the Z, $StO_2$, or PTT values that occur during a cardiac arrhythmia.

In some examples, external device 12 may determine the instructions for medical intervention independent of clinician input, such as by selecting among treatment options stored in a memory of external device 12 or a centralized database that are associated with a diagnostic score and the current values of Z, $StO_2$, and PTT of patient 4. In other examples, a clinician may determine the instructions for medical intervention on substantially the same basis, and input the instructions to external device 12. External device 12 then may transmit the instructions to an interface of the user device with patient 4 (154). In some examples, external device 12 may transmit follow-up queries to patient 4 or a caregiver via the user device after transmitting the instructions. Such queries may include questions pertaining to patient 4's understanding of the transmitted instructions, whether patient 4 has complied with the instructed medical intervention, and/or whether patient 4 is experiencing symptoms. External device 12 may store patient 4's responses in a memory of external device 12, or in a centralized database. A clinician may review the responses, and remotely follow-up with patient 4 as needed following any changes to patient 4's heart failure treatment. In this manner, the techniques and systems described herein advantageously may enable patient 4 to receive individualized, frequently updated treatment at less expense than a comparable number of clinician visits would incur. In addition, the techniques and systems may help reduce cardiac remodeling that may be caused by acute decompensation episodes, which in turn may help minimize the progression of a heart failure condition of patient 4.

Figure 10:
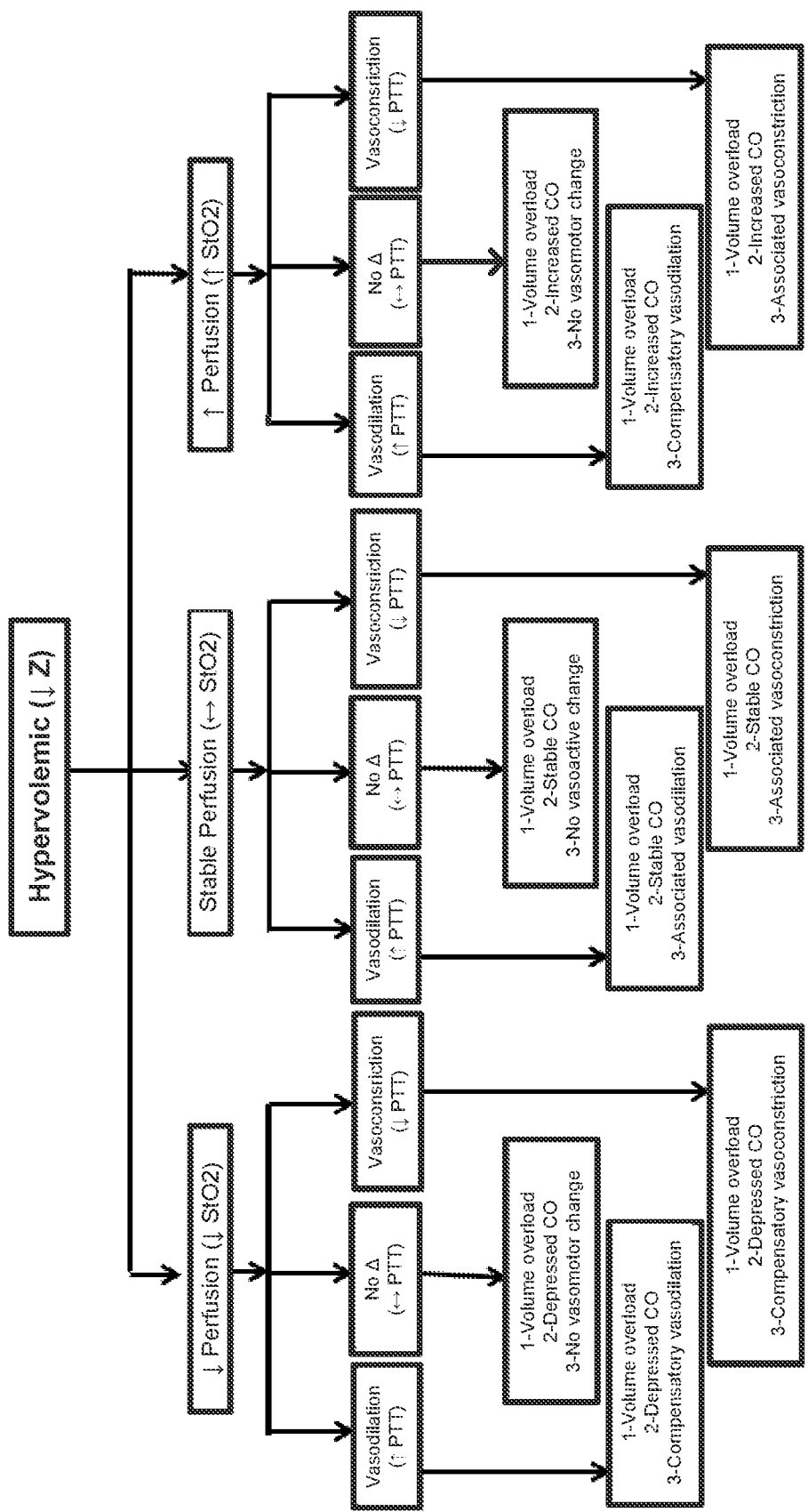
FIG. 10 is a flow diagram illustrating an example technique for determining appropriate medical interventions for a hypervolemic patient based on trends in the patient's tissue oxygen saturation and pulse transit time.
Figure 11:
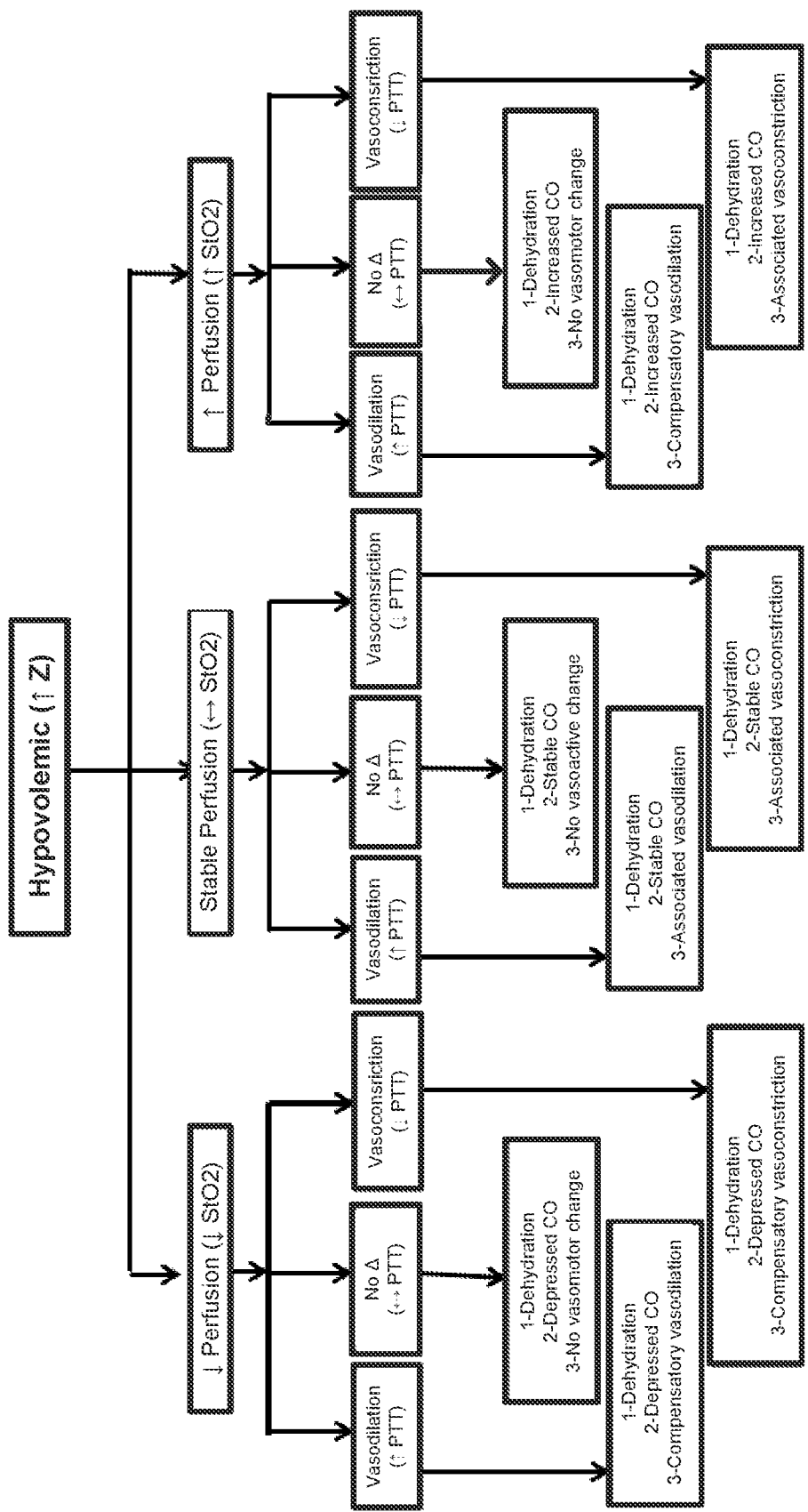
FIG. 11 is a flow diagram illustrating an example technique for determining appropriate medical interventions for a hypovolemic patient based on trends in the patient's tissue oxygen saturation and pulse transit time.
Figure 12:
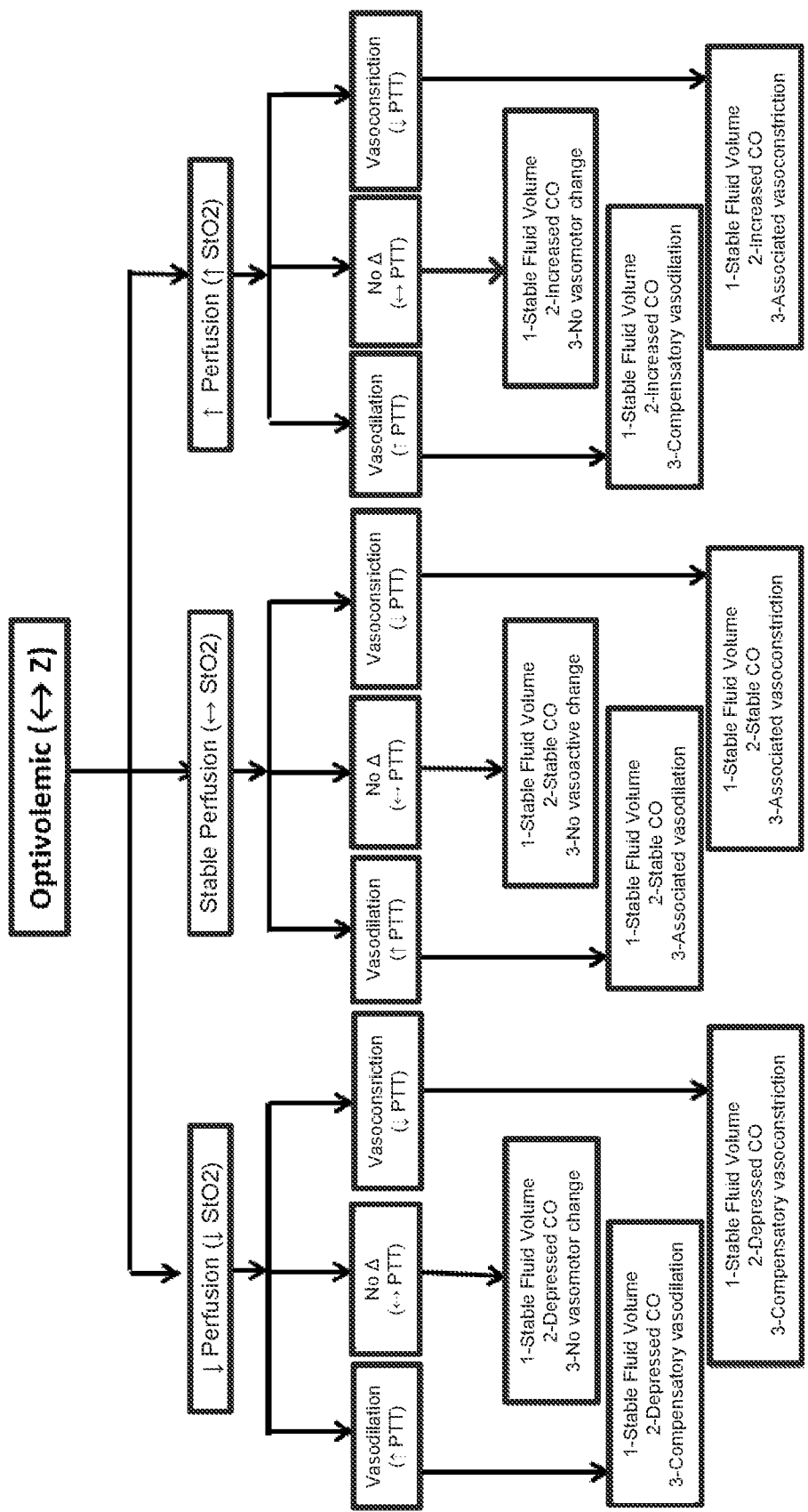
FIG. 12 is a flow diagram illustrating an example technique for determining appropriate medical interventions for an optivolemic patient based on trends in the patient's tissue oxygen saturation and pulse transit time.

FIGS. 10-12 are flow diagrams illustrating example techniques for determining appropriate medical interventions for a patient (e.g., patient 4), depending upon qualitative assessments of three heart failure parameters corresponding to current values of Z, $StO_2$, and PTT for patient 4. The flow diagrams of FIGS. 10-12 are in the form of decision trees that branch off into specific hemodynamic profiles that may represent a heart failure status of patient 4 determined IMD 10 according to the methods described above. In some examples, one or both of external device 12 or a clinician may use the flow diagrams of FIGS. 10-12, in conjunction with the heart failure status and current Z, $StO_2$, and PTT values of patient 4, to determine instructions for a medical intervention for patient 4. However, for the sake of clarity, the flow diagrams of FIGS. 10-12 are described below from the perspective of external device 12, which may include processing circuitry configured to carry out the decisions illustrated in FIGS. 10-12.

FIG. 10 is a flow diagram illustrating an example technique for determining appropriate medical interventions for a hypervolemic patient 4 based on trends in the patient 4's tissue oxygen saturation and pulse transit time. At the top of the flow chart of FIG. 10, external device 12 has received a heart failure status of patient 4 from IMD 10 that includes an indication that patient 4 is hypervolemic (i.e., congested). For example, a current value of Z transmitted to external device 12 by IMD 10 may be relatively low, thereby indicating congestion. In some examples, external device 12 may determine that patient 4 is congested by comparing the current Z value of patient 4 to a threshold value for congestion, and determining that the current Z value satisfies the threshold. Such a threshold value for Z, as well as corresponding threshold values for $StO_2$ and PTT described with respect to FIGS. 10-12, may be stored in a memory of external device 12 or in a centralized database.

After determining that patient 4 is congested, external device 12 may determine a peripheral perfusion status of patient 4 based on a current $StO_2$ value of patient 4 transmitted to external device 12 by IMD 10. For example, external device 12 may compare the current $StO_2$ value of patient 4 to an $StO_2$ threshold value indicative of adequate peripheral perfusion, and determine whether the current $StO_2$ value is less than, approximately equal to, or greater than the threshold $StO_2$ value. External device 12 also may determine a vascular/blood pressure status of patient 4 by comparing a current PTT value of patient 4 transmitted to external device 12, by comparing the current PTT value of patient 4 to a PTT threshold value. The PTT threshold value may be indicative of a neutral vascular state. Thus, a current value of PTT that is greater than the PTT threshold value may indicate vasodilation, a current PTT value that is approximately equal to the PTT threshold value may indicate neither vasodilation nor vasoconstriction, and a current PTT value that is less than the PTT threshold may indicate vasoconstriction.

By following the decision tree illustrated in FIG. 10 and comparing the current values of $StO_2$ and PTT to the corresponding threshold values, external device 12 may determine a hemodynamic profile of patient 4 that includes congestion, peripheral perfusion, and vascular/blood pressure statuses. However, it should be noted such statuses of patient 4 may not necessarily reflect absolute values of congestion, tissue perfusion, or blood pressure of patient 4. For example, a blood pressure status of patient 4 may not necessarily be a measurement of an absolute blood pressure value of patient 4, but instead may indicate a change in blood pressure of patient 4 that may be associated with a change in afterload. In the example of FIG. 10, in which example external device 12 initially has determined that patient 4 is congested, the possible hemodynamic profiles of patient 4 are shown in the lower-most boxes of the flow chart of FIG. 10. For example, as shown in the lower-most box of the left-most branch of FIG. 10, patient 4 has a hemodynamic profile that indicates that patient 4 is congested ("volume overload"), has inadequate peripheral perfusion ("depressed CO [cardiac output]"), and is exhibiting vasodilation ("compensatory vasodilation").

External device 12 then may use this hemodynamic profile of patient 4 to determine one or more medical interventions configured to reduce a likelihood that patient 4 may acutely decompensate, require hospitalization, or experience other types of adverse medical events. For example, based on the congested status of patient 4, external device 12 may instruct patient 4 to undertake medical interventions configured to decrease excess fluid retention. Based on the inadequate perfusion of patient 4 in this example, external device 12 may instruct patient 4 to undertake medical interventions configured to increase heart rate (if heart rate is too low), and/or increase contractility (if contractility is too low). Based on the vasodilation of patient 4 in this example, external device 12 may instruct patient 4 to undertake medical interventions configured to cause vasoconstriction and raise blood pressure. Regardless of the hemodynamic profile of patient 4 (i.e., the nine lower-most boxes of FIG. 10), external device 12 may determine one or more medical interventions for patient 4 based on considerations similar to those described above.

In some examples, some of the medical interventions that external device 12 may recommend based on one status of patient 4 may be conditioned on another status of patient 4. For example, some medical interventions for inadequate peripheral perfusion may be conditioned upon a vascular/blood pressure status of patient 4. Thus, in determining which medical interventions to instruct patient 4 to undertake, external device 12 may take into account all three statuses of patient 4 reflected by the hemodynamic profile. In this manner, the methods and systems described herein may provide robust heart failure treatment that takes into account multiple parameters of a heart failure condition of patient 4.

FIG. 11 is a flow diagram illustrating an example technique for determining appropriate medical interventions for a hypovolemic patient 4 based on trends in the patient 4's tissue oxygen saturation and pulse transit time. The decision tree in FIG. 11 is substantially similar in function to the decision tree in FIG. 10. For example, the decision tree in FIG. 11 also provides a method for external device 12 to determine a hemodynamic profile of patient 4 based on the congestion, peripheral perfusion, and vascular/blood pressure statuses of patient 4, and use the hemodynamic profile in determining which medical interventions to recommend for patient 4. Unlike the flow diagram of FIG. 10, the flow diagram of FIG. 11 begins with a determination (e.g., by external device 12) that patient 4 is hypovolemic (e.g., dehydrated). However, as with the decision tree of FIG. 10, external device 12 may take into account all three statuses of patient 4 reflected by a hemodynamic profile of FIG. 11 in determining which medical interventions to instruct patient 4 to undertake.

FIG. 12 is a flow diagram illustrating an example technique for determining appropriate medical interventions for an optivolemic patient 4 based on trends in the patient 4's tissue oxygen saturation and pulse transit time. The decision tree in FIG. 12 is substantially similar in function to the decision trees in FIGS. 10 and 11. For example, the decision tree in FIG. 12 also provides a method for external device 12 to determine a hemodynamic profile of patient 4 based on the congestion, peripheral perfusion, and vascular/blood pressure statuses of patient 4, and use the hemodynamic profile in determining which medical interventions to recommend for patient 4. Unlike the flow diagram of FIGS. 10 and 11, the flow diagram of FIG. 12 begins with a determination (e.g., by external device 12) that patient 4 is optivolemic (e.g., neither congested nor dehydrated). However, as with the decision trees of FIGS. 10 and 11, external device 12 may take into account all three statuses of patient 4 reflected by a hemodynamic profile of FIG. 12 in determining which medical interventions to instruct patient 4 to undertake.

Although processing circuitry 50 of IMD 10 and processing circuitry of external device 12 is described above as being configured to perform one or more of the steps of the techniques illustrated in FIGS. 6-12, any steps of the techniques described herein may be performed by processing circuitry of the other of IMD 10 or external device 12, or by one or more other devices. For example, processing circuitry of external device 12, or of any other suitable implantable or external device or server, may be configured to perform one or more of the steps described as being performed by processing circuitry 50 of IMD 10. In other examples, processing circuitry 50 of IMD 10, or of any other suitable implantable or external device or server, may be configured to perform one or more of the steps described as being performed by processing circuitry of external device 12. Such other implantable or external devices may include, for example, an implantable pacemaker or ICD, an external monitoring device, or any other suitable device. In addition, although the optical sensors and electrodes are described herein as being positioned on a housing of IMD 10, in other examples, such optical sensors and/or electrodes may be positioned on a housing of another device implanted in or external to patient 4, such as a transvenous, subcutaneous, or extravascular pacemaker or ICD, or coupled to such a device by one or more leads.

In some examples, the techniques described herein (e.g., with respect to FIGS. 6-12) may include determining values of one or more other parameters in addition to or instead of any of Z, $StO_2$, and PTT. As described above with respect to FIG. 1, sensors on IMD 10 or one or more other implanted or external devices may be configured to sense signals associated with such parameters. For example, one or more implanted or external devices of medical system 2 (e.g., IMD 10) may include one or more sensors configured to sense blood or tissue levels of one or more compounds associated with kidney function of patient 4, such as creatinine or blood urea nitrogen. In such examples, techniques for determining a heart failure status of patient 4 may include determining, by processing circuitry of IMD 10, external device 12, or one or more other implanted or external devices or servers, a current value of the one or more other parameters, comparing such a current value to a corresponding baseline, and using the comparison in determining the heart failure status of patient 4. In some examples, such one or more other parameters may not be directly associated with changes in a heart failure status, but may provide other information about the health of patient 4, such as activity levels or sleep patterns. In any such examples, external device 12, or another suitable device, may determine the instructions for medical intervention for patient 4 at least partially based on a status of patient 4 associated with the one or more other parameters, such as a kidney status of patient 4 associated with a current creatinine value of patient 4.

Various aspects of the techniques may be implemented within one or more processors, including one or more microprocessors, DSPs, ASICs, FPGAs, or any other equivalent integrated or discrete logic circuitry, as well as any combinations of such components, embodied in programmers, such as physician or patient programmers, electrical stimulators, or other devices. The term "processor" or "processing circuitry" may generally refer to any of the foregoing logic circuitry, alone or in combination with other logic circuitry or any other equivalent circuitry.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media forming a tangible, non-transitory medium. Instructions may be executed by one or more processors, such as one or more DSPs, ASICs, FPGAs, general purpose microprocessors, or other equivalent integrated or discrete logic circuitry. Accordingly, the terms "processor" or "processing circuitry" as used herein may refer to one or more of any of the foregoing structures or any other structure suitable for implementation of the techniques described herein.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements. The techniques of this disclosure may be implemented in a wide variety of devices or apparatuses, including an IMD, an external programmer, a combination of an IMD and external programmer, an integrated circuit (IC) or a set of ICs, and/or discrete electrical circuitry, residing in an IMD and/or external programmer.

Various aspects of the disclosure have been described. These and other aspects are within the scope of the following claims.

What is claimed is:

1. A medical device system comprising:
   a medical device configured to be implanted underneath skin of a patient, wherein a length of the medical device is within a range from 20 millimeters (mm) to 60 mm, wherein a width of the medical device is within a range from 3 mm to 10 mm, wherein a depth of the medical device is within a range from 2 mm to 9 mm, and wherein the medical device has a rectangular cross-section along the length, the medical device comprising:
   a housing;
   a set of electrodes comprising:
      a first electrode located on a first end portion of the housing; and
      a second electrode located on a second end portion of the housing; and
   an optical sensor located between the first end portion and the second end portion, wherein the medical device is configured to:
   collect, via the set of electrodes, a subcutaneous tissue impedance signal corresponding to tissue adjacent the housing;
   collect, via the set of electrodes from the tissue adjacent the housing, a cardiac electrogram signal, wherein the cardiac electrogram signal is separate from the subcutaneous tissue impedance signal; and
   collect, using the optical sensor, an optical sensor signal by controlling the optical sensor to emit light into the tissue adjacent the housing and detect reflected light from the tissue adjacent the housing; and processing circuitry configured to:
  determine a tissue oxygen saturation value of the patient based on the optical sensor signal corresponding to the tissue adjacent the housing;
  determine a subcutaneous tissue impedance value of the patient based on the subcutaneous tissue impedance signal corresponding to the tissue adjacent the housing;
  determine a pulse transit time value of the patient based on the cardiac electrogram signal collected from the tissue adjacent the housing and the optical sensor signal corresponding to the tissue adjacent the housing; and
  determine a heart failure status of the patient based on the tissue oxygen saturation value corresponding to the tissue adjacent the housing, the subcutaneous tissue impedance value corresponding to the tissue adjacent the housing, and the pulse transit time value, wherein the heart failure status is one of a set of heart failure statuses determined by the processing circuitry over a period of time.

2. The medical device system of claim 1, wherein the set of electrodes further comprises one or more third electrodes located on the housing between the first end portion and the second end portion.

3. The medical device system of claim 2, wherein the medical device is configured to:
  collect, via the first electrode and the second electrode, the cardiac electrogram signal, wherein the cardiac electrogram signal is separate from the subcutaneous tissue impedance signal; and
  collect, via the one or more third electrodes, the subcutaneous tissue impedance signal, wherein the subcutaneous tissue impedance signal is separate from the cardiac electrogram signal.

4. The medical device system of claim 2, wherein the medical device is configured to:
  collect, via the first electrode and the second electrode, the subcutaneous tissue impedance signal, wherein the tissue impedance signal is separate from the cardiac electrogram signal; and
  collect, via the one or more third electrodes, the cardiac electrogram signal, wherein the cardiac electrogram signal is separate from the subcutaneous tissue impedance signal.

5. The medical device system of claim 1, wherein to determine the heart failure status of the patient, the processing circuitry is further configured to:
  determine whether the tissue oxygen saturation value corresponds to a change in a tissue perfusion status of the patient;
  determine whether the subcutaneous tissue impedance value corresponds to a change in a congestion status of the patient; and
  determine whether the pulse transit time value corresponds to a change in a blood pressure status of the patient.

6. The medical device system of claim 5,
  wherein to determine whether the tissue oxygen saturation value corresponds to a change in a tissue perfusion status of the patient, the processing circuitry is configured to determine whether a difference between the tissue oxygen saturation value and a baseline tissue oxygen saturation value is greater than a threshold tissue oxygen saturation value,
  wherein to determine whether the subcutaneous tissue impedance value corresponds to a change in a congestion status of the patient, the processing circuitry is configured to determine whether a difference between the subcutaneous tissue impedance value and a baseline subcutaneous tissue impedance value is greater than a threshold subcutaneous tissue impedance value, and
  wherein to determine whether the pulse transit time value corresponds to a change in a blood pressure status of the patient, the processing circuitry is configured to determine whether a difference between the pulse transit time value and a baseline pulse transit time value is greater than a threshold pulse transit time value.

7. The medical device system of claim 6, wherein to determine the heart failure status of the patient, the processing circuitry is further configured to:
  determine a weighted value of the difference between the tissue oxygen saturation value and the baseline tissue oxygen saturation value;
  determining a weighted value of the difference between the subcutaneous tissue impedance value and the baseline subcutaneous tissue impedance value;
  determining a weighted value of the difference between the pulse transit time value and the baseline pulse transit time value; and
  combine the weighted value of the difference between the tissue oxygen saturation value and the baseline tissue oxygen saturation value, the weighted value of the difference between the subcutaneous tissue impedance value and the baseline subcutaneous tissue impedance value, and the weighted value of the difference between the pulse transit time value and the baseline pulse transit time value.

8. The medical device system of claim 1, wherein the processing circuitry is further configured to:
  transmit the heart failure status of the patient to a remote device;
  receive, from the remote device, instructions for a medical intervention based on the heart failure status of the patient; and
  transmit the instructions for the medical intervention to a user interface.

9. The medical device system of claim 8, wherein the instructions for the medical intervention comprise at least one of a change in a drug selection, a change in a drug dosage, instructions to schedule a visit with a clinician, and instructions for the patient to seek medical attention.

10. The medical device system of claim 1, wherein the period of time is greater than one week.

11. The medical device system of claim 1, wherein the period of time is greater than one month.

12. The medical device system of claim 1, wherein the processing circuitry is configured to determine the set of heart failure statuses according to a predetermined time interval.

13. The medical device system of claim 12, wherein the predetermined time interval comprises one heart failure status every twelve hours, one heart failure status per day, or one heart failure status per week.

14. A medical device configured to be implanted underneath skin of a patient, wherein a length of the medical device is within a range from 20 millimeters (mm) to 60 mm, wherein a width of the medical device is within a range from 3 mm to 10 mm, wherein a depth of the medical device is within a range from 2 mm to 9 mm, and wherein the medical device has a rectangular cross-section along the length, the medical device comprising:

a housing;
a set of electrodes comprising:
  a first electrode located on a first end portion of the housing; and
  a second electrode located on a second end portion of the housing; and
an optical sensor located between the first end portion and the second end portion, wherein the medical device is configured to:
  collect, via the set of electrodes, a subcutaneous tissue impedance signal corresponding to tissue adjacent the housing;
  collect, via the set of electrodes from the tissue adjacent the housing, a cardiac electrogram signal, wherein the cardiac electrogram signal is separate from the subcutaneous tissue impedance signal; and
  collect, using the optical sensor, an optical sensor signal by controlling the optical sensor to emit light into the tissue adjacent the housing and detect reflected light from the tissue adjacent the housing; and
processing circuitry configured to:
  determine a tissue oxygen saturation value of the patient based on the optical sensor signal corresponding to the tissue adjacent the housing;
  determine a subcutaneous tissue impedance value of the patient based on the subcutaneous tissue impedance signal corresponding to the tissue adjacent the housing;
  determine a pulse transit time value of the patient based on the cardiac electrogram signal collected from the tissue adjacent the housing and the optical sensor signal corresponding to the tissue adjacent the housing; and
  determine a heart failure status of the patient based on the tissue oxygen saturation value corresponding to the tissue adjacent the housing, the subcutaneous tissue impedance value corresponding to the tissue adjacent the housing, and the pulse transit time value, wherein the heart failure status is one of a set of heart failure statuses determined by the processing circuitry over a period of time.

15. The medical device of claim 14, wherein to determine the heart failure status of the patient, the processing circuitry is further configured to:
  determine whether the tissue oxygen saturation value corresponds to a change in a tissue perfusion status of the patient;
  determine whether the subcutaneous tissue impedance value corresponds to a change in a congestion status of the patient; and
  determine whether the pulse transit time value corresponds to a change in a blood pressure status of the patient.

16. The medical device of claim 15,
  wherein to determine whether the tissue oxygen saturation value corresponds to a change in a tissue perfusion status of the patient, the processing circuitry is configured to determine whether a difference between the tissue oxygen saturation value and a baseline tissue oxygen saturation value is greater than a threshold tissue oxygen saturation value,
  wherein to determine whether the subcutaneous tissue impedance value corresponds to a change in a congestion status of the patient, the processing circuitry is configured to determine whether a difference between the subcutaneous tissue impedance value and a baseline subcutaneous tissue impedance value is greater than a threshold subcutaneous tissue impedance value, and
  wherein to determine whether the pulse transit time value corresponds to a change in a blood pressure status of the patient, the processing circuitry is configured to determine whether a difference between the pulse transit time value and a baseline pulse transit time value is greater than a threshold pulse transit time value.

17. The medical device of claim 16, wherein to determine the heart failure status of the patient, the processing circuitry is further configured to:
  determine a weighted value of the difference between the tissue oxygen saturation value and the baseline tissue oxygen saturation value;
  determining a weighted value of the difference between the subcutaneous tissue impedance value and the baseline subcutaneous tissue impedance value;
  determining a weighted value of the difference between the pulse transit time value and the baseline pulse transit time value; and
  combine the weighted value of the difference between the tissue oxygen saturation value and the baseline tissue oxygen saturation value, the weighted value of the difference between the subcutaneous tissue impedance value and the baseline subcutaneous tissue impedance value, and the weighted value of the difference between the pulse transit time value and the baseline pulse transit time value.

18. A non-transitory computer-readable medium comprising instructions for causing one or more processors to:
  collect, via a set of electrodes of a medical device having a length within a range from 20 millimeters (mm) to 60 mm and having a rectangular cross-section along the length, a width within a range from 3 mm to 10 mm, and a depth of the within a range from 2 mm to 9 mm and being configured to be implanted underneath skin of a patient, a subcutaneous tissue impedance signal, wherein the medical device comprises a housing, wherein the set of electrodes comprises a first electrode located on a first end portion of the housing and a second electrode located on a second end portion of the housing, and wherein the subcutaneous tissue impedance signal corresponds to tissue adjacent the housing;
  collect, via the set of electrodes from the tissue adjacent the housing, a cardiac electrogram signal, wherein the cardiac electrogram signal is separate from the subcutaneous tissue impedance signal;
  collect, using an optical sensor located between the first end portion and the second end portion, an optical sensor signal by controlling the optical sensor to emit light into the tissue adjacent the housing and detect reflected light from the tissue adjacent the housing;
  determine a tissue oxygen saturation value of the patient based on the optical sensor signal corresponding to the tissue adjacent the housing;
  determine a subcutaneous tissue impedance value of the patient based on the subcutaneous tissue impedance signal corresponding to the tissue adjacent the housing;
  determine a pulse transit time value of the patient based on the cardiac electrogram signal collected from the tissue adjacent the housing and the optical sensor signal corresponding to the tissue adjacent the housing; and
  determine a heart failure status of the patient based on the tissue oxygen saturation value corresponding to the tissue adjacent the housing, the subcutaneous tissue impedance value corresponding to the tissue adjacent the housing, and the pulse transit time value, wherein the heart failure status is one of a set of heart failure statuses determined by processing circuitry over a period of time.

19. The medical device system of claim 1, wherein the medical device comprises the processing circuitry.

20. The medical device system of claim 8, wherein the heart failure status of the patient includes an indication that the patient is one of hypervolemic, hypovolemic, or optivolemic based on a congestion status of the patient, wherein the processing circuitry differentially diagnoses the patient as one of hypervolemic, hypovolemic, or optivolemic based on the congestion status of the patient by comparing the subcutaneous tissue impedance value to one or more subcutaneous tissue impedance thresholds, and wherein the remote device is configured to:
- determine a tissue perfusion status of the patient based on a comparison of the tissue oxygen saturation value to one or more tissue oxygen saturation thresholds;
- determine a blood pressure status of the patient based on a comparison of the pulse transit time value to one or more pulse transit time thresholds;
- based on the indication that the patient is one of hypervolemic, hypovolemic, or optivolemic, the comparison of the tissue oxygen saturation value to the one or more tissue oxygen saturation thresholds, and the comparison of the pulse transit time value to the one or more pulse transit time thresholds, determine a hemodynamic profile of the patient; and
- determine the instructions for the medical intervention based on the hemodynamic profile of the patient.

* * * * *